(12) United States Patent
Wu et al.

(10) Patent No.: US 11,513,671 B2
(45) Date of Patent: Nov. 29, 2022

(54) SPLIT-SCREEN DISPLAY METHOD FOR TERMINAL AND APPARATUS

(71) Applicant: Huawei Technologies Co., Ltd., Shenzhen (CN)

(72) Inventors: Zhiheng Wu, Shanghai (CN); Honglei Luo, Shanghai (CN); Wei Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/059,733

(22) PCT Filed: May 25, 2019

(86) PCT No.: PCT/CN2019/088447
§ 371 (c)(1),
(2) Date: Nov. 30, 2020

(87) PCT Pub. No.: WO2019/228283
PCT Pub. Date: Dec. 5, 2019

(65) Prior Publication Data
US 2021/0216195 A1   Jul. 15, 2021

(30) Foreign Application Priority Data

May 28, 2018  (CN) .......................... 201810524961.0
Jun. 12, 2018  (CN) .......................... 201810604044.3

(51) Int. Cl.
*G06F 3/048* (2013.01)
*G06F 3/04845* (2022.01)
(Continued)

(52) U.S. Cl.
CPC ........ *G06F 3/04845* (2013.01); *G06F 3/0481* (2013.01); *H04M 1/724* (2021.01); *G06F 3/04886* (2013.01); *G06F 2203/04803* (2013.01)

(58) Field of Classification Search
CPC .............. G06F 3/04845; G06F 3/0481; G06F 3/04886; G06F 2203/04803; H04M 1/724
See application file for complete search history.

(56) References Cited

U.S. PATENT DOCUMENTS 8,660,912 B1 * 2/2014 Dandekar .............. G06Q 30/02
  705/26.1
10,564,845 B2 * 2/2020 Kwon ................... G06F 3/0488
(Continued)

FOREIGN PATENT DOCUMENTS

| CN | 103279303 A | 9/2013 |
| CN | 104935651 A | 9/2015 |

(Continued)

OTHER PUBLICATIONS

Altitude Labs, 5 lessons you can learn from Amazon's recommendation engine, Jul. 1, 2017 (Year: 2017).*

*Primary Examiner* — Mahelet Shiberou
(74) *Attorney, Agent, or Firm* — Conley Rose, P.C.

(57) ABSTRACT

Embodiments of the present invention provide a split-screen display method and an apparatus, and relate to the field of terminal technologies, to display detailed information about intelligent prompt information on split screens, thereby improving user experience. The method is applied to a terminal including at least one display. The method includes: obtaining the intelligent prompt information; displaying the detailed information corresponding to the intelligent prompt information in a first display area of a first display, where the (Continued)

first display is one of the at least one display, and the first display area is a partial display area of the first display.

20 Claims, 31 Drawing Sheets

(51) Int. Cl.
*H04M 1/724* (2021.01)
*G06F 3/0481* (2022.01)
G06F 3/04886 (2022.01)

(56) References Cited

U.S. PATENT DOCUMENTS

| | | | |
|---|---|---|---|
| 2015/0186024 | A1 | 7/2015 | Hong et al. |
| 2016/0110028 | A1* | 4/2016 | Choi ................... H04M 1/2746 715/733 |
| 2016/0288643 | A1* | 10/2016 | Kotter ................... G06F 3/0488 |
| 2017/0344253 | A1* | 11/2017 | Zhang ............... H04M 1/72484 |
| 2018/0048885 | A1* | 2/2018 | Lee .......................... G06F 3/167 |
| 2020/0042171 | A1* | 2/2020 | Tao ........................ G06F 3/0484 |

FOREIGN PATENT DOCUMENTS

| | | |
|---|---|---|
| CN | 104991705 A | 10/2015 |
| CN | 106445553 A | 2/2017 |
| CN | 107678826 A | 2/2018 |
| EP | 3223127 A1 | 9/2017 |
| WO | 2016033035 A1 | 3/2016 |

\* cited by examiner

SPLIT-SCREEN DISPLAY METHOD FOR TERMINAL AND APPARATUS

CROSS-REFERENCE TO RELATED APPLICATIONS

This application is a U.S. National Stage of International Patent Application No. PCT/CN2019/088447, filed on May 25, 2019, which claims priority to Chinese Patent Application No. 201810604044.3, filed on Jun. 12, 2018, and Chinese Patent Application No. 201810524961.0, filed on May 28, 2018. All of the aforementioned applications are hereby incorporated by reference in their entireties.

TECHNICAL FIELD

Embodiments of the present invention relate to the field of terminal technologies, and in particular, to a split-screen display method and apparatus.

BACKGROUND

With rapid development of an artificial intelligence (AI) technology, the AI technology is increasingly widely applied to a terminal (for example, a smart phone), and a mobile phone with an AI function may actively provide intelligent reminder information for a user.

Currently, an intelligent terminal may push intelligent prompt information, and present the intelligent prompt information to a user by using a display of the intelligent terminal. After the user performs a corresponding operation (for example, an operation of touching the intelligent prompt information) on the display of the intelligent terminal, detailed information corresponding to the intelligent prompt information may be displayed on the display of the intelligent terminal.

However, in the foregoing method, because the intelligent terminal displays the detailed information corresponding to the intelligent prompt information in full screen, when the detailed information corresponding to the intelligent prompt information is displayed in full screen, a current operation of the user is interrupted (for example, an interface for displaying the intelligent prompt information completely blocks an interface of another task that is being performed by the user), thereby affecting user experience.

SUMMARY

This application provides a split-screen display method and apparatus, to display detailed information about intelligent prompt information on split screens, thereby improving user experience.

To achieve the foregoing objective, the following technical solutions are used in this application.

According to a first aspect, a split-screen display method is provided. The method is applied to a terminal including at least one display. The method may include: obtaining intelligent prompt information; and displaying detailed information corresponding to the intelligent prompt information in a first display area of a first display, where the first display is one of the at least one display, and the first display area is a partial display area of the first display.

According to the split-screen display method provided in this application, when the terminal obtains intelligent prompt information, the detailed information corresponding to the intelligent prompt information may be displayed in the first display area of the first display of the terminal, and an interface of a task that is being performed on the terminal before the terminal obtains the intelligent prompt information is still displayed in another display area of the first display. Therefore, when the detailed information corresponding to the intelligent prompt information is displayed, another task that is being performed by a user of the terminal is not affected, so that user experience can be improved.

In a first optional implementation of the first aspect, a first interface is currently displayed on the first display, and a method for displaying the detailed information corresponding to the intelligent prompt information in the first display area of the first display may include: displaying a second interface on the first display, where the second interface includes the first display area and a second display area, the first display area includes the detailed information corresponding to the intelligent prompt information, the second display area includes related information corresponding to the first interface, and the first display area and the second display area are located at a same layer.

In this application, the detailed information corresponding to the intelligent prompt information and the related information corresponding to the first interface are separately displayed in the two display areas of the second interface. The user may interactively compare the first display area with the second display area, and may separately perform different operations on the first display area and the second display area of the first display.

In a second optional implementation of the first aspect, after the obtaining intelligent prompt information and before the displaying detailed information corresponding to the intelligent prompt information in a first display area of a first display, the split-screen display method provided in this application may further include: receiving a first operation of a user, where the first operation is used to indicate the terminal to display the detailed information corresponding to the intelligent prompt information in the partial display area of the first display.

In a third optional implementation of the first aspect, the method for displaying the detailed information corresponding to the intelligent prompt information in the first display area of the first display may include: displaying the second interface on the first display in response to the first operation.

In this application, when the terminal obtains the intelligent prompt information, through human-computer interaction, that is, after the user performs the first operation on the first display, the terminal may be triggered to display the detailed information corresponding to the intelligent prompt information in a partial region of the first display.

In a fourth optional implementation of the first aspect, before the obtaining intelligent prompt information, the split-screen display method provided in this application may further include: receiving a second operation of a user, where the second operation is an operation, set by the user, of directly displaying the second interface on the first display when the terminal obtains the intelligent prompt information.

In this application, the user may preset, in a "Settings" menu of the terminal, an option for enabling split-screen display, so that after obtaining the intelligent prompt information, the terminal may directly display the detailed information corresponding to the intelligent prompt information on split screens, that is, the terminal directly displays the second interface on the first display. The second interface includes the first display area and the second display area. The first display area includes the detailed information corresponding to the intelligent prompt information. The second display area includes the related information corresponding to the first interface.

In a fifth optional implementation of the first aspect, after the displaying a second interface on the first display, the split-screen display method provided in this application may further include: receiving a third operation performed by the user on the second interface, where the third operation is used to indicate the terminal to adjust a size of the first display area and/or the second display area; and displaying a third interface in response to the third operation, where the third interface includes an adjusted first display area and/or an adjusted second display area.

In a sixth optional implementation of the first aspect, the second interface further includes an area division line, and a method for receiving the third operation performed by the user on the second interface may include: receiving a third operation performed by the user on the area division line of the second interface, where the third interface includes the adjusted first display area and the adjusted second display area.

In this application, the third operation is an operation of instructing the terminal to adjust sizes of the first display area and the second display area, that is, the user performs the third operation on the second interface, so that the sizes of the first display area and the second display area can be adjusted simultaneously.

In a seventh optional implementation of the first aspect, after the displaying a second interface on the first display, the split-screen display method provided in this application may further include: receiving a fourth operation of the user; and displaying a fourth interface on the first display in response to the fourth operation.

In this application, after obtaining the intelligent prompt information and displaying the second interface (that is, displaying the related information corresponding to the first interface and the detailed information corresponding to the intelligent prompt information on split screens), the terminal may receive the fourth operation of the user, where the fourth operation is an operation of ending display of the detailed information corresponding to the intelligent prompt information, so that the terminal exits the detailed information corresponding to the intelligent prompt information in response to the fourth operation and displays the fourth interface on the first display. The fourth interface may be the first interface, or the fourth interface may be another interface different from the first interface.

In an eighth optional implementation of the first aspect, when the first interface includes the intelligent prompt information, the receiving a first operation of a user may specifically include: receiving a first operation performed by the user on the first interface.

In this application, when the intelligent prompt information is displayed on the first interface (the intelligent prompt information is displayed by using a fixed bar, a floating window, or a bubble), the user may perform the first operation on the first interface. Specifically, the user may perform the first operation on a region in which the intelligent prompt information is displayed on the first interface, so that the terminal displays the second interface including the first display area and the second display area in response to the first operation.

In a ninth optional implementation of the first aspect, when the first interface does not include the intelligent prompt information, after the obtaining intelligent prompt information and before the receiving a first operation, the split-screen display method provided in this application may further include: receiving a fifth operation of the user; and displaying a fifth interface including the intelligent prompt information in response to the fifth operation; and the receiving a first operation may specifically include: receiving a first operation performed by the user on the fifth interface.

In this application, when the intelligent prompt information is not displayed on the first interface (the intelligent prompt information is displayed by using a drop-down bar or a leftmost screen), the user first performs the fifth operation, the terminal displays the fifth interface including the intelligent prompt information in response to the fifth operation, and then the first operation is performed on the fifth interface, to trigger split-screen display of the first display area and the second display area.

According to a second aspect, a terminal is provided. The terminal has at least one display. The terminal includes an obtaining module and a display module. The obtaining module is configured to obtain intelligent prompt information. The display module is configured to display detailed information corresponding to the intelligent prompt information in a first display area of a first display, where the first display is one of the at least one display, and the first display area is a partial display area of the first display.

In a first optional implementation of the second aspect, a first interface is currently displayed on the first display, and the display module is specifically configured to display a second interface on the first display, where the second interface includes the first display area and a second display area, the first display area includes the detailed information corresponding to the intelligent prompt information, the second display area includes related information corresponding to the first interface, and the first display area and the second display area are located at a same layer.

In a second optional implementation of the second aspect, the terminal further includes a receiving module. The receiving module is configured to: after the obtaining module obtains the intelligent prompt information and before the display module displays the detailed information corresponding to the intelligent prompt information in the first display area of the first display, receive a first operation of a user, where the first operation is used to indicate the display module to display the detailed information corresponding to the intelligent prompt information in the partial display area of the first display.

In a third optional implementation of the second aspect, the display module is specifically configured to display the second interface on the first display in response to the first operation.

In a fourth optional implementation of the second aspect, the receiving module is further configured to: before the obtaining module obtains the intelligent prompt information, receive a second operation of a user, where the second operation is an operation, set by the user, of directly displaying the second interface on the first display when the terminal obtains the intelligent prompt information.

In a fifth optional implementation of the second aspect, the receiving module is further configured to: after the display module displays the second interface on the first display, receive a third operation performed by the user on the second interface, where the third operation is used to indicate to adjust a size of the first display area and/or the second display area.

In a sixth optional implementation of the second aspect, the second interface further includes an area division line, and the receiving module is specifically configured to receive a third operation performed by the user on the area division line of the second interface, where the third interface includes an adjusted first display area and an adjusted second display area.

In a seventh optional implementation of the second aspect, the receiving module is further configured to: after the display module displays the second interface on the first display, receive a fourth operation of the user; and the display module is further configured to display a fourth interface on the first display in response to the fourth operation.

In an eighth optional implementation of the second aspect, the first interface includes the intelligent prompt information, and the receiving module is specifically configured to receive a first operation performed by the user on the first interface.

In a ninth optional implementation of the second aspect, when the first interface does not include the intelligent prompt information, the receiving module is further configured to: after the obtaining module obtains the intelligent prompt information and before the first operation is received, receive a fifth operation of the user; the display module is configured to display a fifth interface including the intelligent prompt information in response to the fifth operation; and the receiving module is specifically configured to receive a first operation performed by the user on the fifth interface.

According to a third aspect, a terminal is provided. The terminal has at least one display. The terminal includes a processor, a memory, and a communications interface. The memory, the display, and the communications interface are coupled to the processor. The communications interface is configured to communicate with another terminal. The memory is configured to store computer program code. The computer program code includes a computer instruction. When the processor executes the computer instruction, the terminal performs the following operations.

The processor is configured to obtain intelligent prompt information. A first display is configured to display detailed information corresponding to the intelligent prompt information in a first display area of the first display, where the first display is one of the at least one display, and the first display area is a partial display area of the first display.

In a first optional implementation of the third aspect, the first display is specifically configured to display a second interface on the first display, where the second interface includes the first display area and a second display area, the first display area includes the detailed information corresponding to the intelligent prompt information, the second display area includes related information corresponding to a first interface, and the first display area and the second display area are located at a same layer.

In a second optional implementation of the third aspect, the processor is further configured to: after the intelligent prompt information is obtained and before the detailed information corresponding to the intelligent prompt information is displayed in the first display area of the first display, receive a first operation of a user, where the first operation is used to indicate to display the detailed information corresponding to the intelligent prompt information in the partial display area of the first display.

In a third optional implementation of the third aspect, the first display is specifically configured to display the second interface on the first display in response to the first operation.

In a fourth optional implementation of the third aspect, the processor is further configured to receive a second operation of a user, where the second operation is an operation, set by the user, of directly displaying the second interface on the first display when the terminal obtains the intelligent prompt information.

In a fifth optional implementation of the third aspect, the processor is further configured to receive a third operation performed by the user on the second interface, where the third operation is used to indicate to adjust a size of the first display area and/or the second display area; and the first display is further configured to display a third interface in response to the third operation, where the third interface includes an adjusted first display area and/or an adjusted second display area.

In a sixth optional implementation of the third aspect, the second interface further includes an area division line, and the processor is specifically configured to receive a third operation performed by the user on the area division line of the second interface, where the third interface includes the adjusted first display area and the adjusted second display area.

In a seventh optional implementation of the third aspect, the receiving module is further configured to: after the second interface is displayed on the first display, receive a fourth operation of the user; and the first display is further configured to display a fourth interface on the first display in response to the fourth operation.

In an eighth optional implementation of the third aspect, the first interface includes the intelligent prompt information, and the processor is specifically configured to receive a first operation performed by the user on the first interface.

In a ninth optional implementation of the third aspect, the first interface does not include the intelligent prompt information; the processor is further configured to: after obtaining the intelligent prompt information and before receiving the first operation, receive a fifth operation of the user; the first display is further configured to display a fifth interface including the intelligent prompt information in response to the fifth operation; and the processor is specifically configured to receive a first operation performed by the user on the fifth interface.

According to a fourth aspect, this application provides a computer storage medium. The computer storage medium includes a computer instruction. When the computer instruction runs on a terminal, the terminal is enabled to perform the split-screen display method according to any one of the first aspect or the optional implementations of the first aspect.

According to a fifth aspect, this application provides a computer program product. When the computer program product runs on a computer, the computer is enabled to perform the split-screen display method according to any one of the first aspect or the optional implementations of the first aspect.

It can be understood that the terminal in the second aspect or the third aspect, the computer storage medium in the fourth aspect, and the computer program product in the fifth aspect are all configured to perform the corresponding methods provided in the foregoing descriptions. Therefore, for beneficial effects that can be achieved by the terminal, the computer storage medium, and the computer program product, refer to the beneficial effects of the corresponding methods provided in the foregoing descriptions. Details are not described herein again.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists.

In the specification and claims of this application, the terms "first", "second", and so on are intended to distinguish between different objects but do not indicate a particular order of the objects. For example, a first operation, a second operation, and the like are intended to distinguish between different operations, but are not intended to describe a particular order of the operations.

In the embodiments of the present invention, the word "example" or "for example" or the like is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word "example" or "for example" or the like is intended to present a related concept in a specific manner.

In the descriptions of the embodiments of the present invention, unless otherwise specified, "plurality" means at least two. For example, a plurality of processing modules mean at least two processing modules. "A plurality of displays" mean at least two displays.

Currently, when displaying detailed information about intelligent prompt information, a terminal displays the detailed information corresponding to the intelligent prompt information in full screen. Therefore, an interface of another task that is being performed by a user is blocked, thereby affecting user experience.

To resolve this problem, embodiments of the present invention provide a split-screen display method and apparatus. When a terminal obtains intelligent information, detailed information about intelligent prompt information may be displayed in a first display area of a first display of the terminal (when the terminal has a plurality of displays, the first display is one of the plurality of displays). Therefore, when the detailed information corresponding to the intelligent prompt information is displayed, another task that is being performed by a user of the terminal is not affected, so that user experience can be improved.

For example, the terminal in the embodiments of the present invention may be a mobile phone, a wearable device, an augmented reality (augmented reality, AR)/virtual reality (virtual reality, VR) device, a tablet computer, a notebook computer, an ultra-mobile personal computer (ultra-mobile personal computer, UMPC), a netbook, or a personal digital assistant (personal digital assistant, PDA). A specific form of the terminal is not particularly limited in the embodiments of the present invention.

Figure 1:
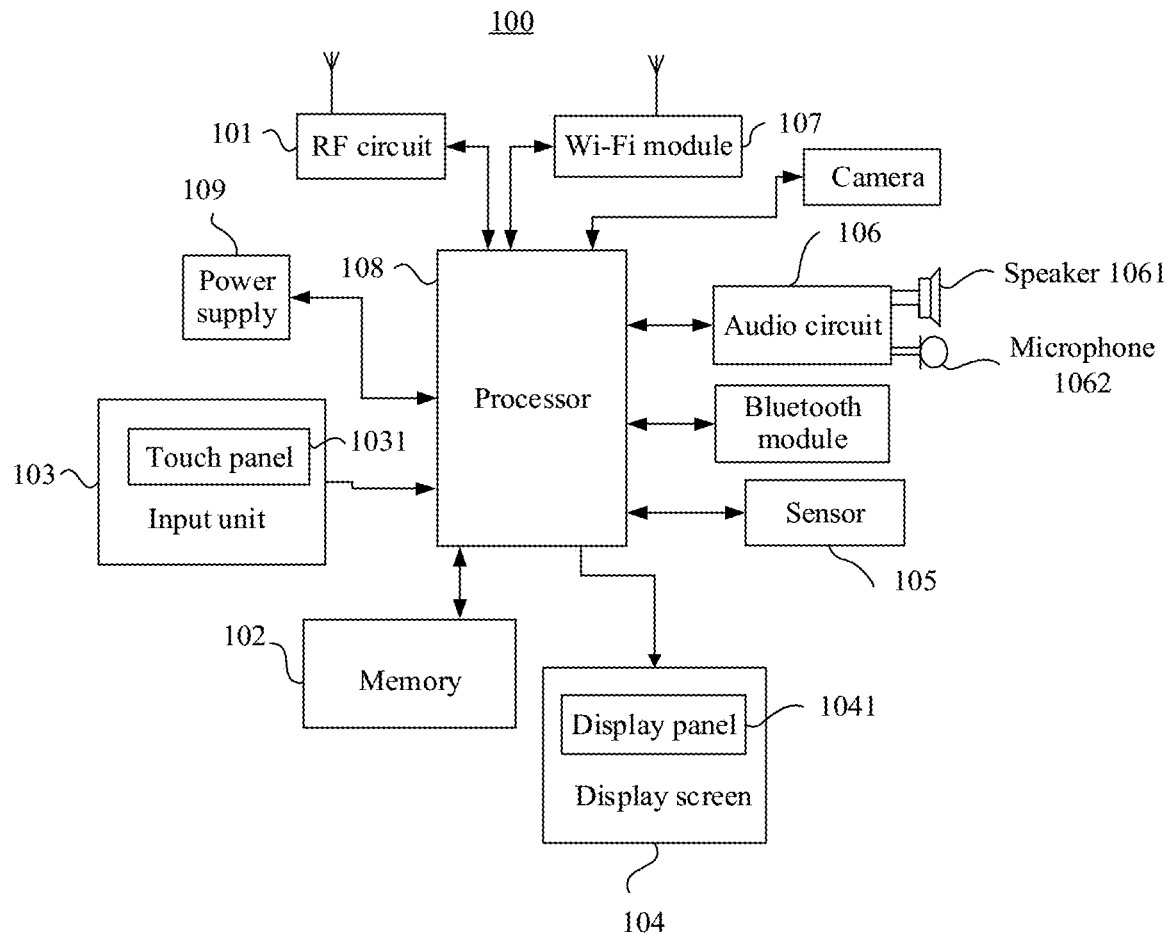
FIG. 1 is a schematic diagram of hardware of a mobile phone according to an embodiment of the present invention.

In the embodiments of the present invention, an example in which the terminal is a mobile phone 100 is used to describe components of the terminal provided in the embodiments of the present invention. The mobile phone 100 shown in FIG. 1 is merely an example of the terminal, and the mobile phone 100 may have more or fewer components than those shown in FIG. 1, or two or more components may be combined, or there may be a different component configuration. The components shown in FIG. 1 may be implemented in hardware, software, or a combination of hardware and software, where the hardware, the software, or the combination of hardware and software includes one or more signal processing and/or application-specific integrated circuits.

As shown in FIG. 1, the mobile phone 100 includes components such as an RF circuit 101, a memory 102, an input unit 103, a display 104, a sensor 105, an audio circuit 106, a Wi-Fi module 107, a processor 108, and a power supply 109. A person skilled in the art can understand that the mobile phone structure shown in FIG. 1 does not constitute a limitation to the mobile phone. The mobile phone may include more or fewer components than those shown in the figure, or some components may be combined, or there may be a different component layout.

The following describes the constituent components of the mobile phone 100 in detail with reference to FIG. 1.

The RF circuit 101 may be configured to send or receive a signal in an information sending/receiving or call process, and may receive downlink information from a base station and send the downlink information to the processor 108 for processing, and send uplink data to the base station. Usually, the RF circuit includes but is not limited to devices such as an antenna, at least one amplifier, a transceiver, a coupler, a low noise amplifier, and a duplexer. In addition, the RF circuit 101 may further communicate with a network and another mobile device through wireless communication. Any communication standard or protocol may be used for the wireless communication, including but not limited to a global system for mobile communications, a general packet radio service, code division multiple access, broadband code division multiple access, long term evolution, an email, a short message service, and the like.

The memory 102 may be configured to store a software program and data. The processor 108 performs various functions and data processing of the mobile phone 100 by running the software program and the data that are stored in the memory 102. The memory 102 may mainly include a program storage region and a data storage region. The program storage region may store an operating system, an application program required by at least one function (for example, an audio play function or an image play function), and the like. The data storage region may store data (for example, audio data or video data) created based on usage of the mobile phone 100.

In addition, the memory 102 may include a high-speed random access memory, or may include a nonvolatile memory, for example, at least one magnetic disk storage device or a flash memory device, or another volatile solid-state storage device. In the following embodiments, the memory 102 stores an operating system that enables the mobile phone 100 to run, for example, an iOS® operating system developed by Apple, an Android® open-source operating system developed by Google, or a Windows® operating system developed by Microsoft.

The input unit 103 may be configured to receive entered numerical or character information, and generate signal input that is related to a user setting and function control of the mobile phone 100. The input unit includes but is not limited to one or more of a touchscreen, a function key (for example, a volume control key or a power on/off key), a physical keyboard, and the like. The input unit 103 may further include a built-in sensor of the mobile phone 100, for example, a gravity sensor or an acceleration sensor. The mobile phone 100 may use a parameter detected by the sensor as input data. For example, the input unit 103 of the mobile phone 100 is a touchscreen. A touch panel 1031 is disposed on the touchscreen 103 on a front side of the mobile phone 100, and may collect a touch operation performed by a user on or near the touch panel 1031 (for example, an operation performed by the user on the touch panel 1031 or near the touch panel 1031 by using any appropriate object or accessory such as a finger or a stylus), and drive a corresponding connection apparatus according to a preset program. Optionally, the touch panel 1031 may include two parts: a touch detection apparatus and a touch controller (not shown in FIG. 1). The touch detection apparatus detects for a touch orientation of the user, detects for a signal brought by the touch operation, and transmits the signal to the touch controller. The touch controller receives touch information from the touch detection apparatus, converts the touch information into contact coordinates, and sends the contact coordinates to the processor 108, and can receive an instruction sent by the processor 108 and execute the instruction. In addition, the touch panel 1031 may be implemented in a plurality of types, for example, a resistive type, a capacitive type, an infrared type, and a surface acoustic wave type.

The display 104 may be configured to display information entered by the user or information provided for the user, and graphical user interfaces (graphical user interface, GUI) of various menus of the mobile phone 100. The display 104 may include a display panel 1041 disposed on the front side of the mobile phone 100. The display panel 1041 may be configured in a form of a liquid crystal display, a light-emitting diode, or the like.

In some embodiments, the mobile phone 100 includes at least one display. A length-width ratio of a display of a mobile phone may be 16:9, 18:9, 19.5:9, or the like. When the mobile phone pushes intelligent prompt information, the intelligent prompt information may be displayed in a fixed region of the display. For a mobile phone in which a length-width ratio of a display is 18:9 or 19.5:9, intelligent prompt information may be displayed in a region by which the display is larger than a conventional display (that is, a display with a length-width ratio of 16:9). For example, a length-width ratio of the display 104 of the mobile phone 100 is 18:9, and intelligent prompt information may be displayed in a display area of 2:9 at the bottom of the display, so that a normal display effect of the mobile phone is not affected.

In some embodiments, the mobile phone 100 includes a front side A and a rear side B. An optical touch key is disposed at the bottom of the front side A. The touch panel 1031 and the display panel 1041 are further disposed on the front side A. The touch panel 1031 covers the display panel 1041. After detecting a touch operation on or near the touch panel 1031, the touch panel 1031 transmits the touch operation to the processor 108 to determine a touch event. Then the processor 108 provides corresponding visual output on the display panel 1041 based on a type of the touch event. The touch panel 1031 and the display panel 1041 serve as two independent components to implement input and output functions of the mobile phone 100. However, in some embodiments, the touch panel 1031 and the display panel 1041 may be integrated to implement the input and output functions of the mobile phone 100. The integrated touch panel 1031 and display panel 1041 may be referred to as a touchscreen for short.

In some other embodiments, a pressure sensor may be further disposed on the touch panel 1031. In this way, when the user performs a touch operation on the touch panel, the touch panel can further detect pressure of the touch operation, so that the mobile phone 100 can detect the touch operation more accurately.

The mobile phone 100 may further include at least one sensor 105, for example, an optical sensor, a motion sensor, and another sensor. Specifically, the optical sensor may include an ambient light sensor and an optical proximity sensor. The ambient light sensor may adjust brightness of the display panel 1041 based on intensity of ambient light. The optical proximity sensor is disposed on the front side of the mobile phone 100. When the mobile phone 100 moves near an ear, the mobile phone 100 turns off a power supply of the display panel 1041 based on detection of the optical proximity sensor, so that the mobile phone 100 can further save power. As a motion sensor, an accelerometer sensor may detect for a value of an acceleration in each direction (there are usually three axes), may detect for a value and a direction of gravity when the mobile phone 100 is still, and may be applied to an application (for example, landscape/portrait mode switching, a related game, or magnetometer posture calibration) for recognizing a posture of the mobile phone, a function (for example, a pedometer or a keystroke) related to vibration recognition, and the like. For another sensor that may be further configured on the mobile phone 100, for example, a gyroscope, a barometer, a hygrometer, a thermometer, or an infrared sensor, details are not described herein.

The audio circuit 106, a speaker 1061, and a microphone 1062 may provide an audio interface between the user and the mobile phone 100. The audio circuit 106 may transmit, to the speaker 1061, an electrical signal that is converted from received audio data. The speaker 1061 converts the electrical signal into an acoustical signal and outputs the acoustical signal. In another aspect, the microphone 1062 converts a collected acoustical signal into an electrical signal. The audio circuit 106 receives the electrical signal, converts the electrical signal into audio data, and outputs the audio data to the RF circuit 101 to send the audio data to, for example, another mobile phone, or outputs the audio data to the memory 102 for further processing.

Wi-Fi is a short-range wireless transmission technology. The mobile phone 100 may use the Wi-Fi module 107 to help the user send or receive an email, browse a web page, access streaming media, and the like. The Wi-Fi module 107 provides wireless broadband Internet access for the user.

The processor 108 is a control center of the mobile phone 100, connects various parts of the entire mobile phone by using various interfaces and lines, and performs various functions and data processing of the mobile phone 100 by running or executing the software program stored in the memory 102 and invoking the data stored in the memory 102, to perform overall monitoring on the mobile phone. In some embodiments, the processor 108 may include one or more processing units. The processor 108 may further integrate an application processor and a modem processor. The application processor mainly processes an operating system, a user interface, an application program, and the like. The modem processor mainly processes wireless communication. It can be understood that the modem processor may be alternatively not integrated in the processor 108.

The power supply 109 (for example, a battery) may supply power to each component of the mobile phone 100. The power supply 109 may be logically connected to the processor 108 by using a power management system, to implement functions such as charging management, discharging management, and power consumption management by using the power management system. It can be understood that, in the following embodiments, the power supply 109 may be configured to supply power to the display panel 1041 and the touch panel 1031.

The mobile phone 100 may further include a Bluetooth module, configured to exchange information with another device by using Bluetooth, which is a short-range communication protocol. For example, the mobile phone 100 may establish, by using the Bluetooth module, a Bluetooth connection to a wearable electronic device (for example, a smartwatch) that also has a Bluetooth module, to exchange data.

The mobile phone 100 may further include a camera, configured to collect an image frame in real time, transmit the image frame to the processor 108 for processing, and store a processing result to the memory 102 and/or present a processing result to the user by using the display panel 1041.

All methods in the following embodiments may be implemented in the mobile phone 100 with the foregoing hardware structure.

Figure 2:
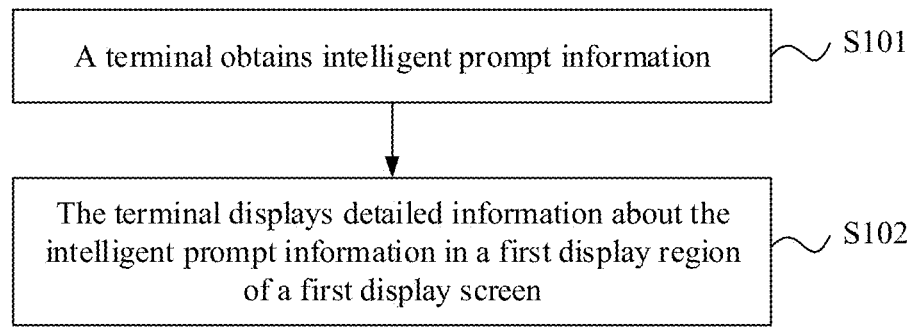
FIG. 2 is a schematic diagram 1 of a split-screen display method according to an embodiment of the present invention.

An embodiment of the present invention provides a split-screen display method, applied to a terminal including at least one display. As shown in FIG. 2, the split-screen display method may include S101 and S102.

S101. The terminal obtains intelligent prompt information.

In this embodiment of the present invention, an intelligent processing module of the terminal may generate some intelligent prompt information based on information such as a scenario in which a user holding the terminal is located, a requirement of the user, or an environment around the user, display the intelligent prompt information on a display of the terminal (which may be understood as pushing), and present the intelligent prompt information to the user. It should be understood that a process in which the terminal generates the intelligent prompt information and displays the intelligent prompt information by using the display of the terminal is a process in which the terminal obtains the intelligent prompt information.

For example, the intelligent prompt information is generated based on a scenario in which the user is located. If the user is located in a new city, the intelligent prompt information may include but is not limited to tourist attraction recommendation information, food recommendation information, hotel recommendation information, and the like about the city. Alternatively, if the user goes to a shopping center, the intelligent prompt information may include but is not limited to commodity discount prompt information about the shopping center. Alternatively, if the user is currently browsing a commodity in a shopping APP on a mobile phone, the intelligent prompt information may include but is not limited to detailed prompt information about the commodity currently browsed by the user, price prompt information about the commodity in another shopping APP, and the like.

Optionally, the terminal may present the intelligent prompt information to the user by using a drop-down bar (that is, an interface presented after a pull-down operation is performed on the top of the display of the terminal), a leftmost screen (that is, an interface presented after a swipe-left operation is performed on the display of the terminal), a fixed bar (that is, a fixed region on the display of the mobile phone, for example, a region at the bottom of the display of the mobile phone), a floating window, or a bubble. A manner of presenting the intelligent prompt information may be any one of the foregoing manners. This is not specifically limited in this embodiment of the present invention.

S102. The terminal displays detailed information corresponding to the intelligent prompt information in a first display area of a first display.

The first display is one of the at least one display of the terminal. The first display area is a partial display area of the first display.

In this embodiment of the present invention, when the terminal has one display, when the terminal obtains the intelligent prompt information, the detailed information corresponding to the intelligent prompt information is displayed in a partial display area of the display of the terminal; or when the terminal has a plurality of displays, for example, the terminal includes two displays: a primary screen and a leftmost screen, for one of the displays (the primary screen is used as an example), when the terminal obtains the intelligent prompt information, the detailed information corresponding to the intelligent prompt information may be displayed in a partial region of the primary screen.

According to the split-screen display method provided in this embodiment of the present invention, when the terminal obtains intelligent information, the detailed information corresponding to the intelligent prompt information may be displayed in the first display area of the first display of the terminal, and an interface of a task that is being performed on the terminal before the terminal obtains the intelligent prompt information is still displayed in another display area of the first display. Therefore, when the detailed information corresponding to the intelligent prompt information is displayed, another task that is being performed by the user of the terminal is not affected, so that user experience can be improved.

Figure 3:
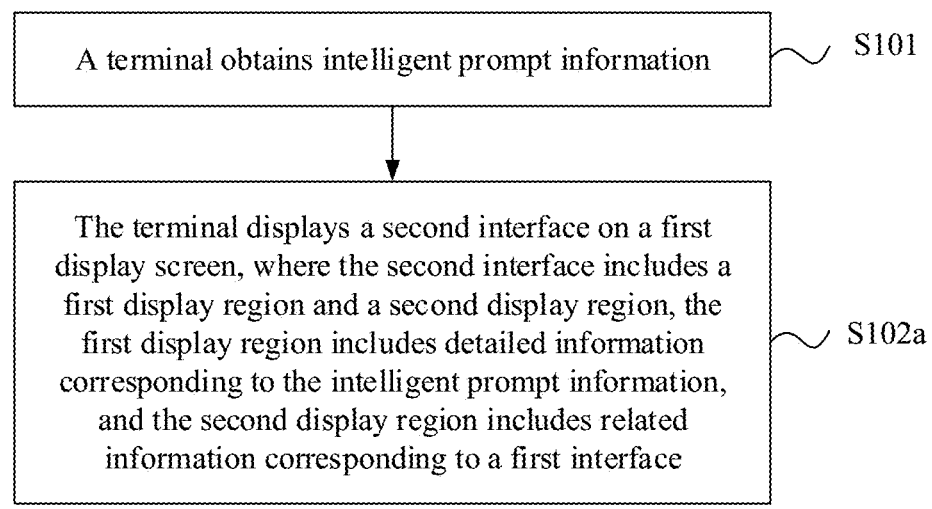
FIG. 3 is a schematic diagram 2 of a split-screen display method according to an embodiment of the present invention.

Specifically, when the terminal currently displays a first interface, with reference to FIG. 2, as shown in FIG. 3, S102 may include S102a.

S102a. The terminal displays a second interface on the first display, where the second interface includes the first display area and a second display area, the first display area includes the detailed information corresponding to the intelligent prompt information, and the second display area includes related information corresponding to the first interface.

The related information corresponding to the first interface is related information of an interface displayed on the first display before the intelligent prompt information is displayed on the first display of the terminal. The first display area and the second display area are located at a same layer.

The first interface may be an interface corresponding to an application currently presented on the first display when the terminal obtains the intelligent prompt information, that is, an interface on which the user is performing a task on the terminal, for example, an interface on which the user performs shopping in a shopping APP or an interface of chat software. Alternatively, the first interface may be a desktop of the terminal, that is, when the terminal obtains the intelligent prompt information, the display of the terminal does not present an interface corresponding to an application.

In this embodiment of the present invention, when the interface currently displayed on the first display of the terminal is the first interface, the terminal may display the second interface after obtaining the intelligent prompt information. The second interface includes the two display areas. The detailed information corresponding to the intelligent prompt information and the related information corresponding to the first interface are separately displayed in the two display areas, and the user may separately perform different operations on the first display area and the second display area of the first display.

Figure 4A:
FIG. 4(a) and FIG. 4(b) are a schematic diagram 1 of an example of a display interface of a terminal according to an embodiment of the present invention.
Figure 4B:
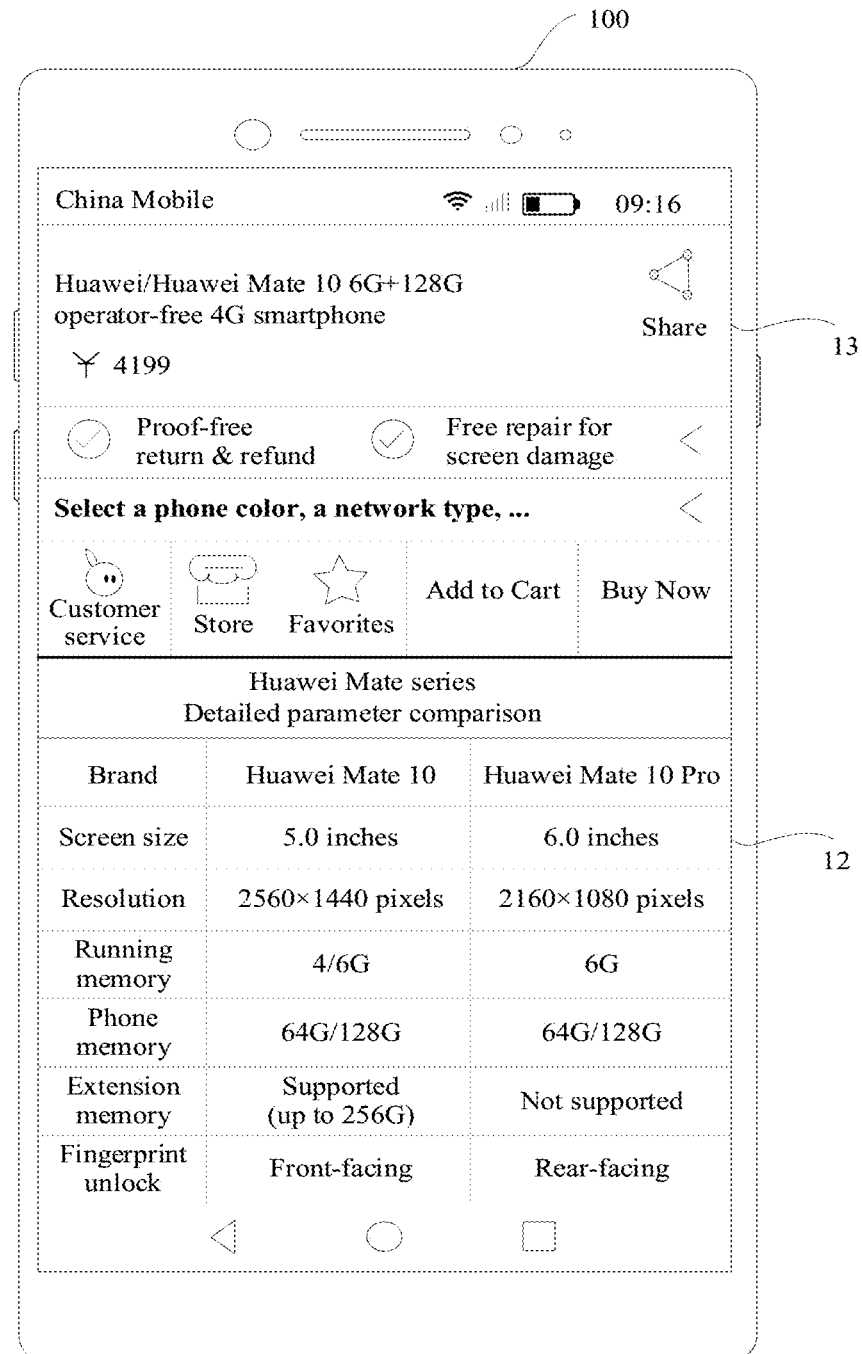

Optionally, the intelligent prompt information obtained by the terminal may be prompt information related to a task currently performed by the user. For example, it is assumed that the user starts a shopping APP on a mobile phone 100, and the user searches for a commodity or selects a recommended commodity (for example, Huawei Mate 10) and enters an information browsing interface 201 of the commodity (the information browsing interface 201 of the commodity is the first interface in the foregoing embodiment). FIG. 4(a) shows an information browsing interface 11 of a commodity 1 currently displayed on a display of the mobile phone 100. In a process in which the user browses information about the commodity, an intelligent information processing module of the terminal may analyze the commodity selected by the user, generate intelligent prompt information about parameters of commodities of a same series (for example, the Huawei Mate 10 and Huawei Mate 10 Pro), push the intelligent prompt information to the display of the mobile phone, display detailed information corresponding to the intelligent prompt information, for example, detailed parameter comparison information (for example, including detailed parameters of the Huawei Mate 10 and detailed parameters of the Huawei Mate 10 Pro) in a first display area of the display, and display related information corresponding to a first interface (that is, the information browsing interface 11) in a second display area of the display. As shown in FIG. 4(b), the first display area 12 of the display of the mobile phone 100 includes the detailed parameter comparison information of the mobile phone, and the second display area 13 of the display of the mobile phone 100 includes the related information corresponding to the information browsing interface 11 of the commodity. Therefore, in a process of browsing commodity information, parameters of commodities of a same series can be compared, thereby providing extensive experience for the user.

Figure 5A:
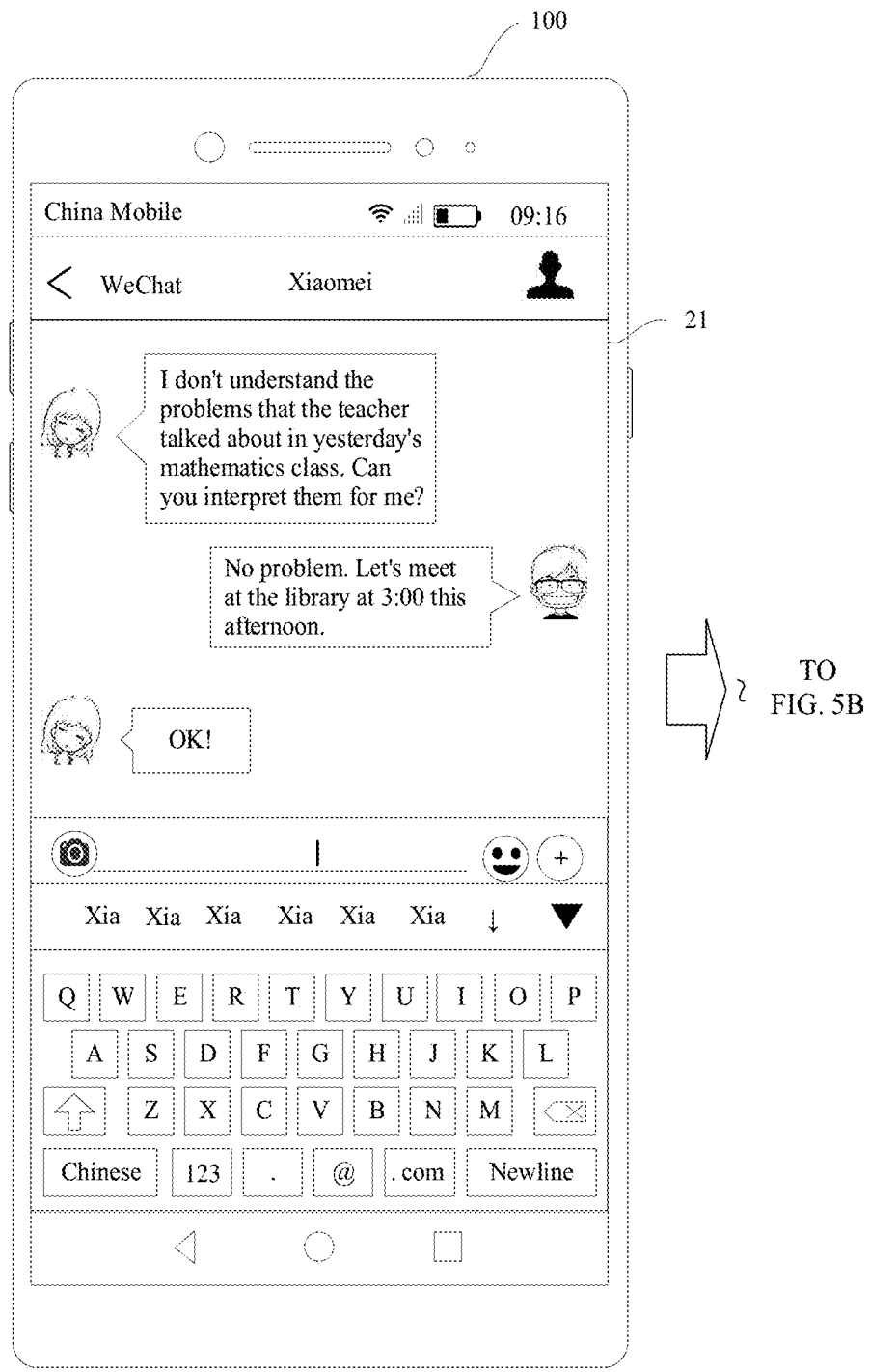
FIG. 5(a) and FIG. 5(b) are a schematic diagram 2 of an example of a display interface of a terminal according to an embodiment of the present invention.
Figure 5B:
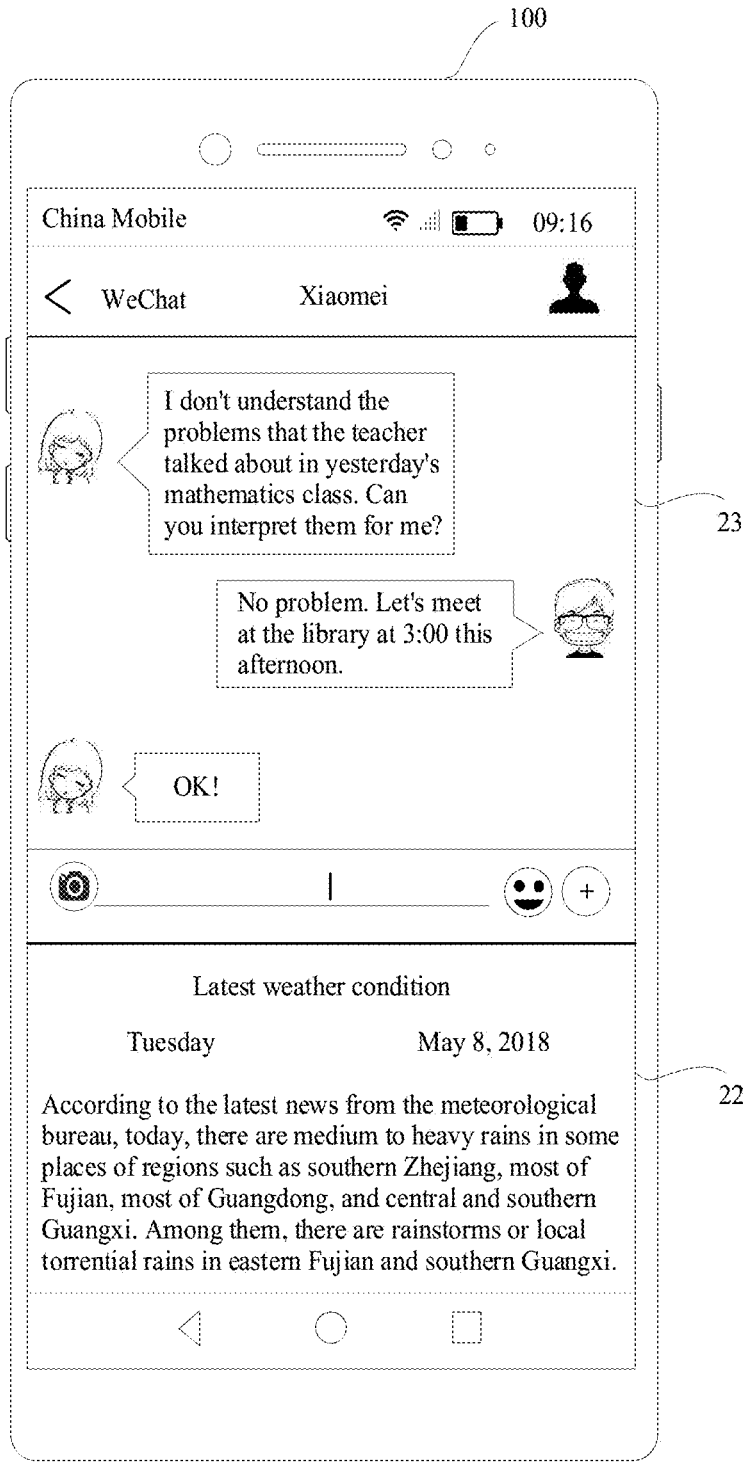

Optionally, the intelligent prompt information obtained by the terminal may be prompt information unrelated to a task currently performed by the user. For example, it is assumed that the user chats on social software (for example, WeChat) on the mobile phone 100, and the display of the mobile phone 100 currently displays a chat interface 21 (the chat interface 21 is the first interface in the foregoing embodiment). FIG. 5(a) shows the chat interface 21 currently displayed on the display of the mobile phone 100. In a process in which the user performs WeChat chatting, the intelligent processing module of the terminal generates weather forecast prompt information based on a current weather condition, pushes the weather forecast prompt information to the display of the mobile phone, displays detailed weather forecast information in a first display area of the display, and displays related information corresponding to a first interface (that is, the chat interface 21) in a second display area of the display. As shown in FIG. 5(b), the first display area 22 of the display of the mobile phone 100 includes the detailed weather forecast information, and the second display area 23 of the display of the mobile phone 100 includes the related information corresponding to the chat interface 21. In this way, with the split-screen display method, when the detailed weather forecast information is displayed, the foregoing WeChat chat interface may not be blocked, so that a chat task currently performed by the user is not interrupted, and experience quality of the user can be improved.

In this embodiment of the present invention, after the terminal displays the intelligent prompt information on the first display, in an implementation, the user may perform a related operation on the first display, and then the detailed information corresponding to the intelligent prompt information is displayed in the first display area of the first display; or in another implementation, the user does not need to perform any operation, and the terminal may directly display the detailed information corresponding to the intelligent prompt information in the first display area of the first display.

Figure 6:
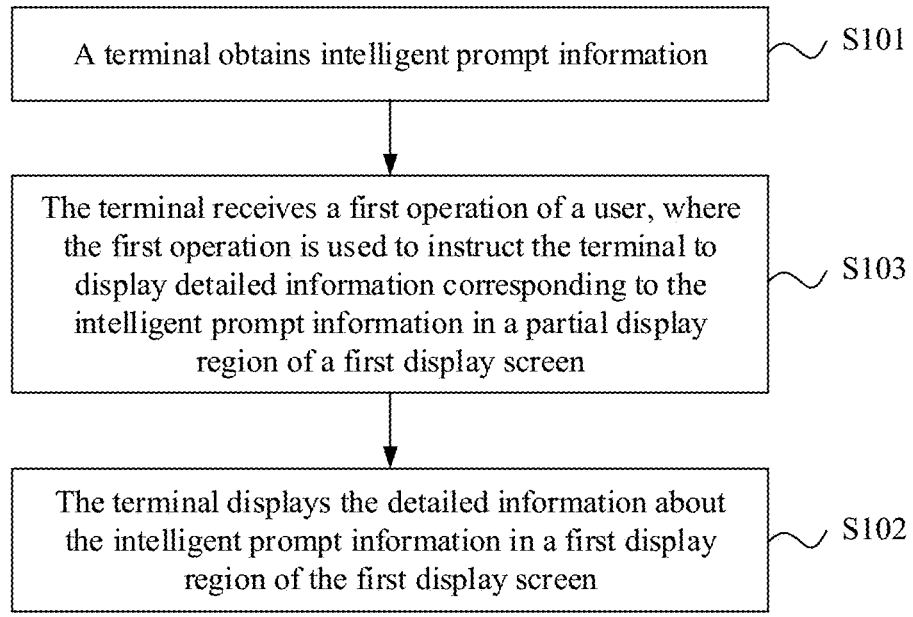
FIG. 6 is a schematic diagram 3 of a split-screen display method for a terminal according to an embodiment of the present invention.

Specifically, with reference to FIG. 2, as shown in FIG. 6, in this embodiment of the present invention, after S101 and before S102, the split-screen display method provided in this embodiment of the present invention may further include S103.

S103. The terminal receives a first operation of the user, where the first operation is used to indicate the terminal to display the detailed information corresponding to the intelligent prompt information in the partial display area of the first display.

In this embodiment of the present invention, the terminal may present the intelligent prompt information to the user by using any one of a drop-down bar, a leftmost screen, a fixed bar, a floating window, a bubble, and the like, so that the user performs the first operation on the intelligent prompt information presented by the terminal, to display the detailed information corresponding to the intelligent prompt information.

It should be noted that, when the terminal currently displays the first interface and the terminal presents the intelligent prompt information by using a fixed bar, a floating window, or a bubble, the first interface includes the intelligent prompt information, that is, the intelligent prompt information is directly displayed on the first interface; or when the terminal presents the intelligent prompt information by using a drop-down bar or a leftmost screen, the first interface does not include the intelligent prompt information, that is, the intelligent prompt information is not displayed on the first interface.

Optionally, the first operation performed by the user on the first interface may be a touchscreen operation performed by the user on the first interface, or the first operation is a key operation performed by the user on the first interface, or the like. This is not specifically limited in this embodiment of the present invention.

For example, the touchscreen operation is a press operation, a touch and hold operation, a swipe operation, a touch operation, or a floating operation (an operation performed by the user near a touchscreen) that is performed by the user on the touchscreen of the terminal. The key operation corresponds to an operation such as a single-press operation, a double-press operation, a press and hold operation, or a combination key operation that is performed by the user on a key such as a power key, a volume key, or a home key of the terminal.

Figure 7:
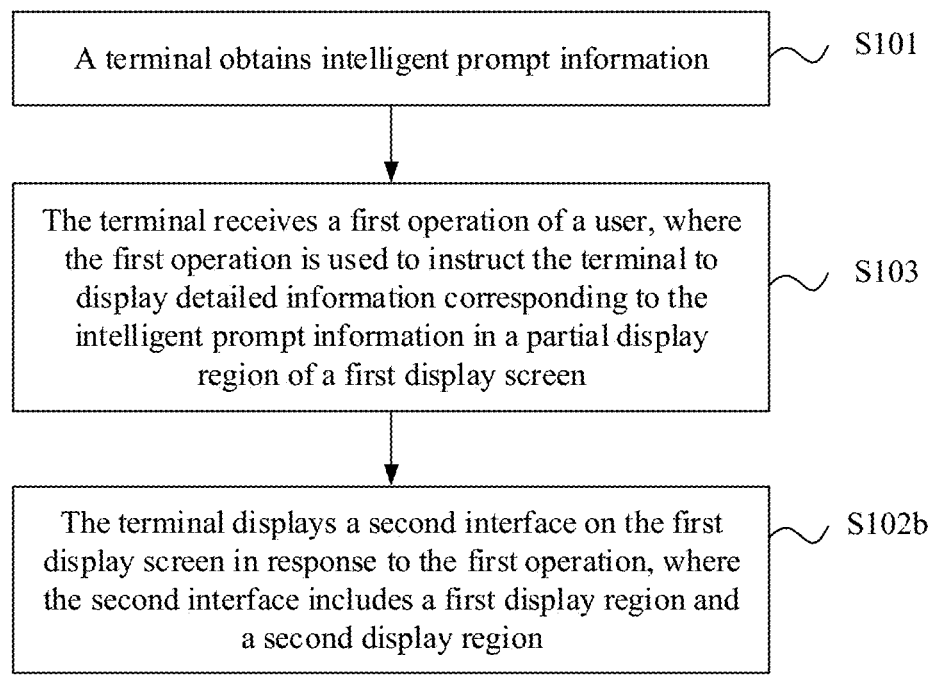
FIG. 7 is a schematic diagram 4 of a split-screen display method for a terminal according to an embodiment of the present invention.

Optionally, with reference to FIG. 6, as shown in FIG. 7, after the terminal receives the first operation of the user, S102 may include S102b.

S102b. The terminal displays a second interface on the first display in response to the first operation, where the second interface includes the first display area and a second display area.

In this embodiment of the present invention, when the first interface includes the intelligent prompt information, after the user performs the first operation on the first interface, the terminal displays the second interface on the first display in response to the first operation. Similar to that in S102a, the second interface includes the first display area and the second display area, the first display area includes the detailed information corresponding to the intelligent prompt information, the second display area includes the related information corresponding to the first interface, and the first display area and the second display area are located at a same layer. Refer to in FIG. 4(b).

Figure 8:
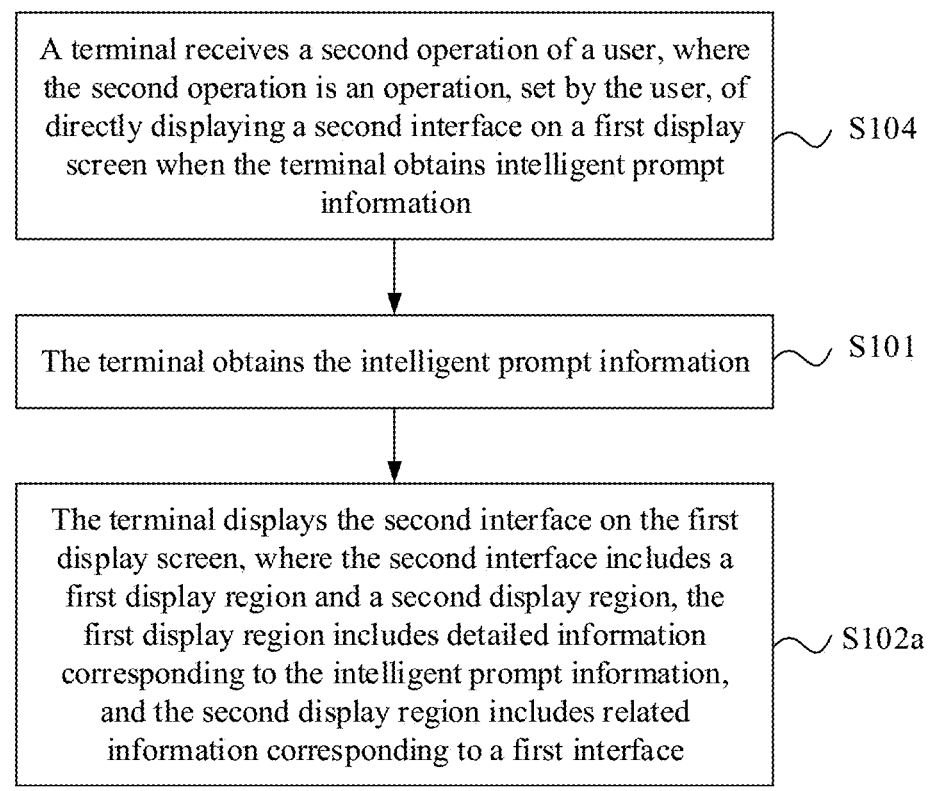
FIG. 8 is a schematic diagram 5 of a split-screen display method for a terminal according to an embodiment of the present invention.

With reference to FIG. 3, as shown in FIG. 8, before S101, the split-screen display method provided in this embodiment of the present invention may further include S104.

S104. The terminal receives a second operation of the user, where the second operation is an operation, set by the user, of directly displaying the second interface on the first display when the terminal obtains the intelligent prompt information.

In this embodiment of the present invention, the user may preset, in a "Settings" menu of the terminal, an option for enabling split-screen display, so that after obtaining the intelligent prompt information, the terminal may directly display the detailed information corresponding to the intelligent prompt information on split screens, that is, the terminal directly displays the second interface on the first display. The second interface includes the first display area and the second display area. The first display area includes the detailed information corresponding to the intelligent prompt information. The second display area includes the related information corresponding to the first interface.

Figure 9:
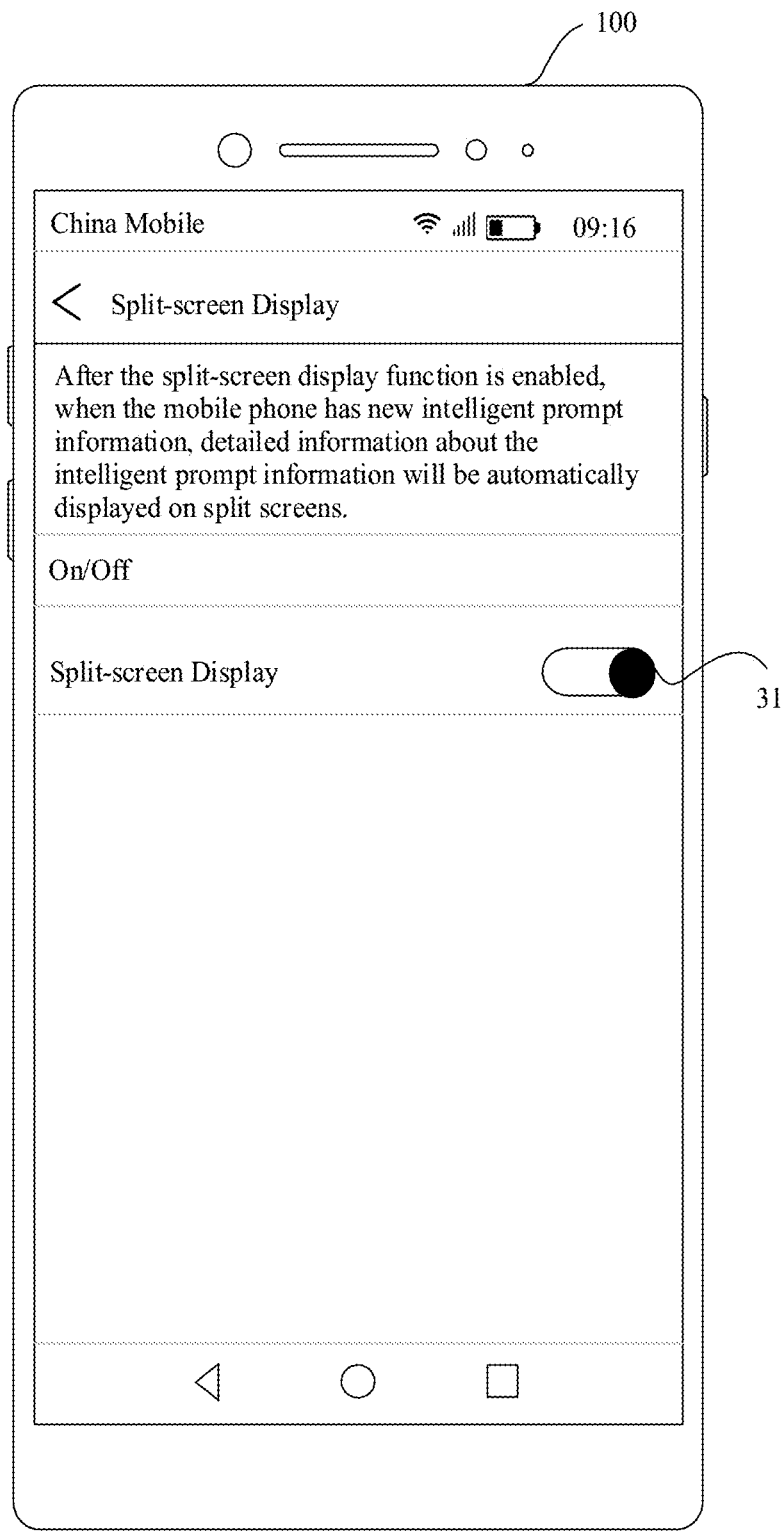
FIG. 9 is a schematic diagram 3 of an example of a display interface of a terminal according to an embodiment of the present invention.

For example, FIG. 9 is a schematic diagram of performing a second operation by the user on the mobile phone 100. The user may set a split-screen display button 31 to an enabled state in a "Split-screen Display" option in a "Display" option of a "Settings" menu of the mobile phone 100, to complete the second operation. In response to the second operation, the terminal may directly display the second interface on the first display when obtaining the intelligent prompt information.

Figure 10:
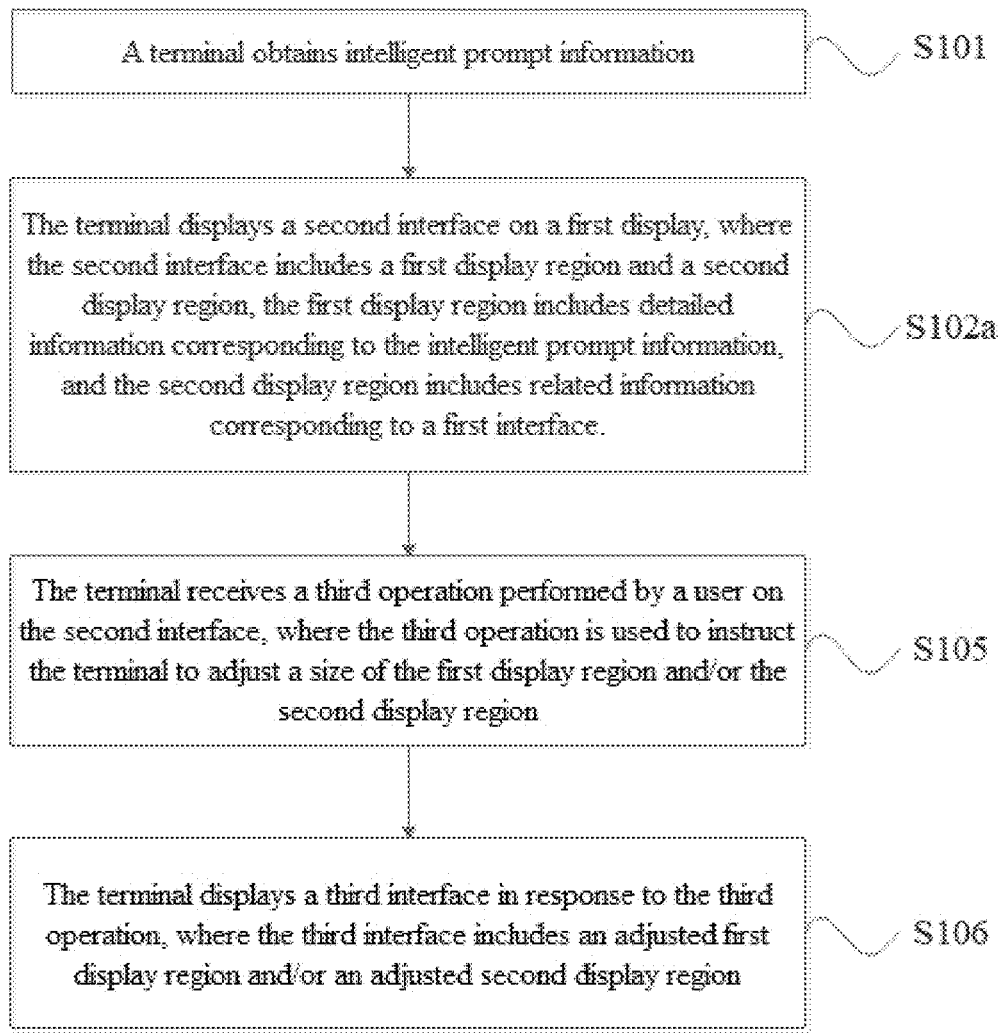
FIG. 10 is a schematic diagram 6 of a split-screen display method for a terminal according to an embodiment of the present invention.

Optionally, with reference to FIG. 3, as shown in FIG. 10, after S102a, the split-screen display method provided in this embodiment of the present invention may further include S105 and S106.

S105. The terminal receives a third operation performed by the user on the second interface, where the third operation is used to indicate the terminal to adjust a size of the first display area and/or the second display area.

S106. The terminal displays a third interface in response to the third operation, where the third interface includes an adjusted first display area and/or an adjusted second display area.

In this embodiment of the present invention, after the terminal obtains the intelligent prompt information and displays the second interface on the first display, the user may perform a corresponding operation on the second interface to adjust the size of the first display area and/or the second display area on the second interface. Specifically, the terminal may adjust sizes of the first display area and the second display area in response to the third operation of the user; or the terminal adjusts only a size of the first display area in response to the third operation of the user; or the terminal adjusts only a size of the second display area in response to the third operation of the user.

In a first implementation, the third operation is an operation of instructing the terminal to adjust the sizes of the first display area and the second display area, that is, the user performs the third operation on the second interface, so that the sizes of the first display area and the second display area can be adjusted simultaneously, and the terminal displays the third interface including the adjusted first display area and the adjusted second display area in response to the third operation.

Figure 11A:
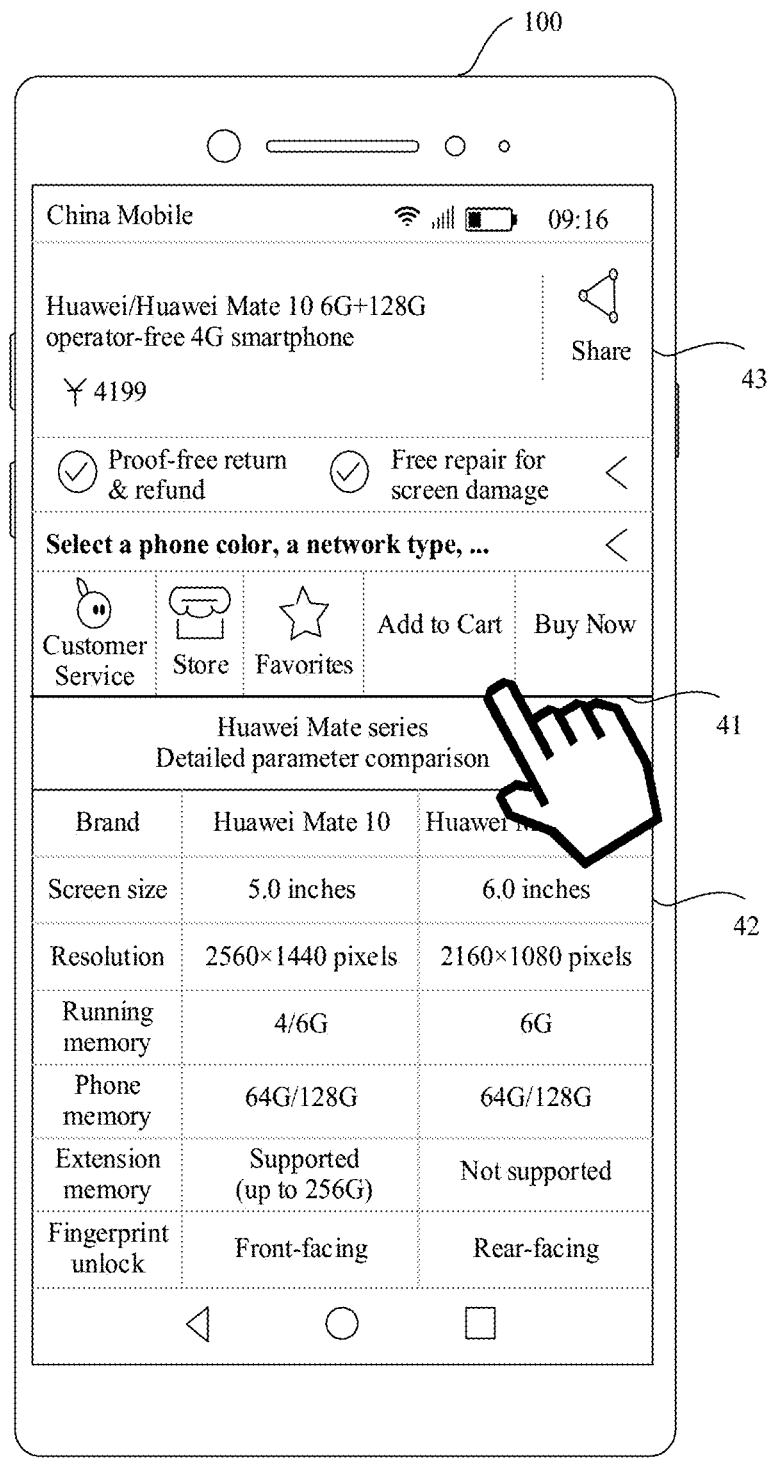
FIG. 11(a) to FIG. 11(c) are a schematic diagram 4 of an example of a display interface of a terminal according to an embodiment of the present invention.

Optionally, as shown in FIG. 11(a), in this embodiment of the present invention, a second interface displayed on the mobile phone 100 may further include an area division line

Figure 11B:
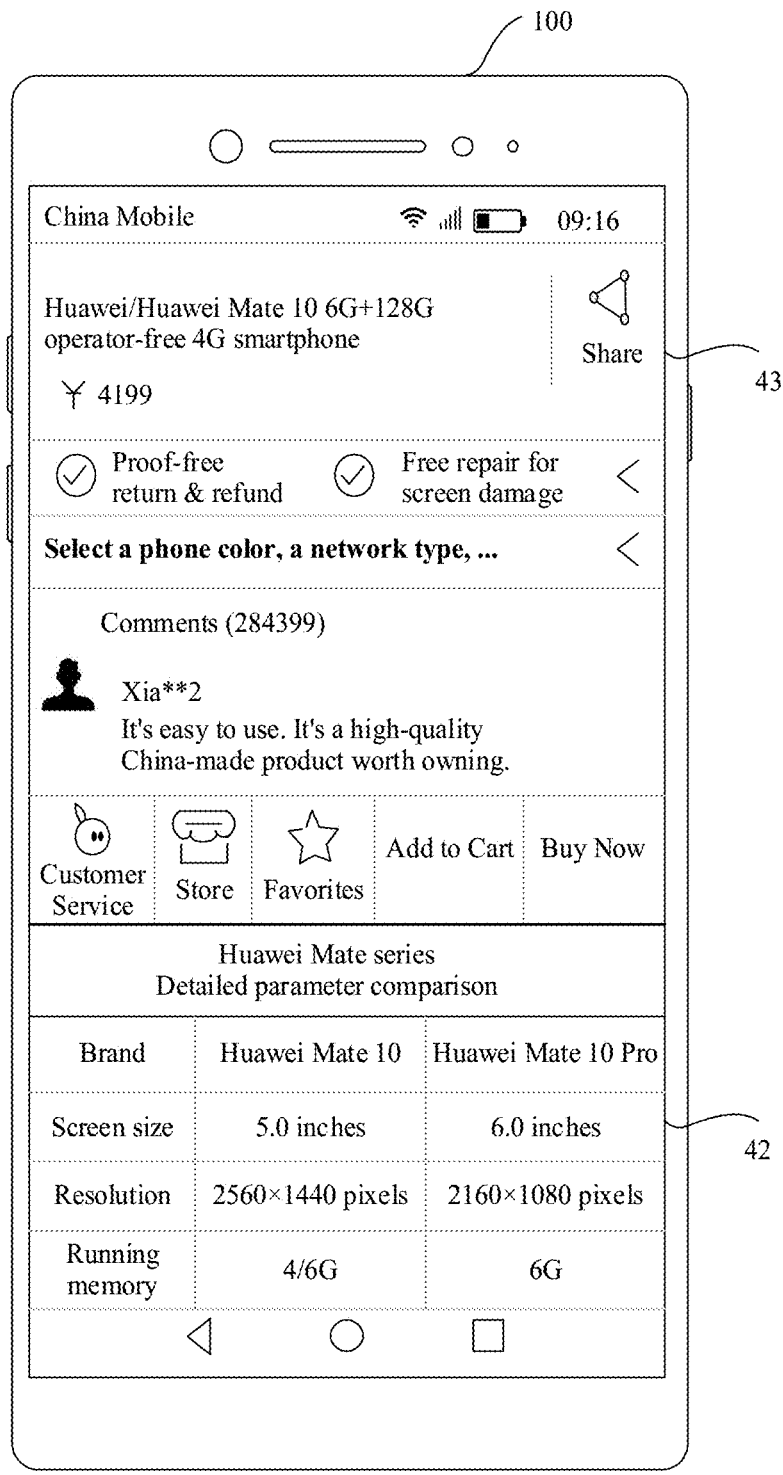
Figure 11C:
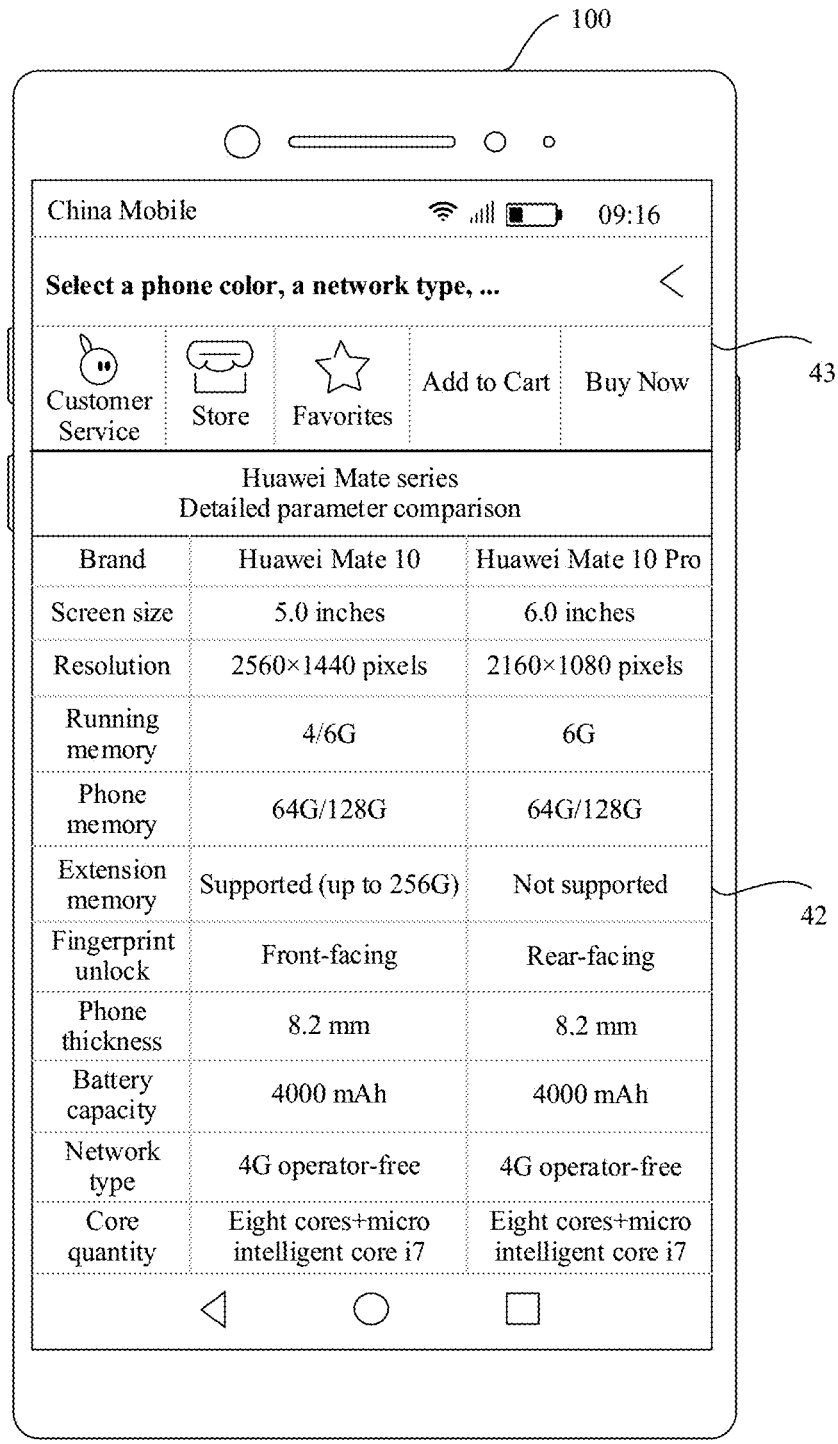

41, and the area division line is located between a first display area 42 and a second display area 43. Assuming that the first display area 42 and the second display area 43 do not overlap, and the first display area 42 and the second display area 43 are combined to form an entire display of the mobile phone 100, the user may drag the area division line 41 (the dragging the area division line 41 is a third operation). The terminal adjusts sizes of the first display area and the second display area in response to the third operation. As shown in FIG. 11(*b*), the user drags the area division line 41 in a direction toward the first display area 42, and it can be learned that the first display area 42 becomes smaller and the second display area 43 becomes larger. As shown in FIG. 11(*c*), the user drags the area division line 41 in a direction toward the second display area 43, and it can be learned that the first display area 42 becomes larger and the second display area 43 becomes smaller.

In a second implementation, the third operation is an operation of instructing the terminal to adjust the size of the first display area, that is, the user performs the third operation on the second interface, to adjust only the size of the first display area.

Figure 12A:
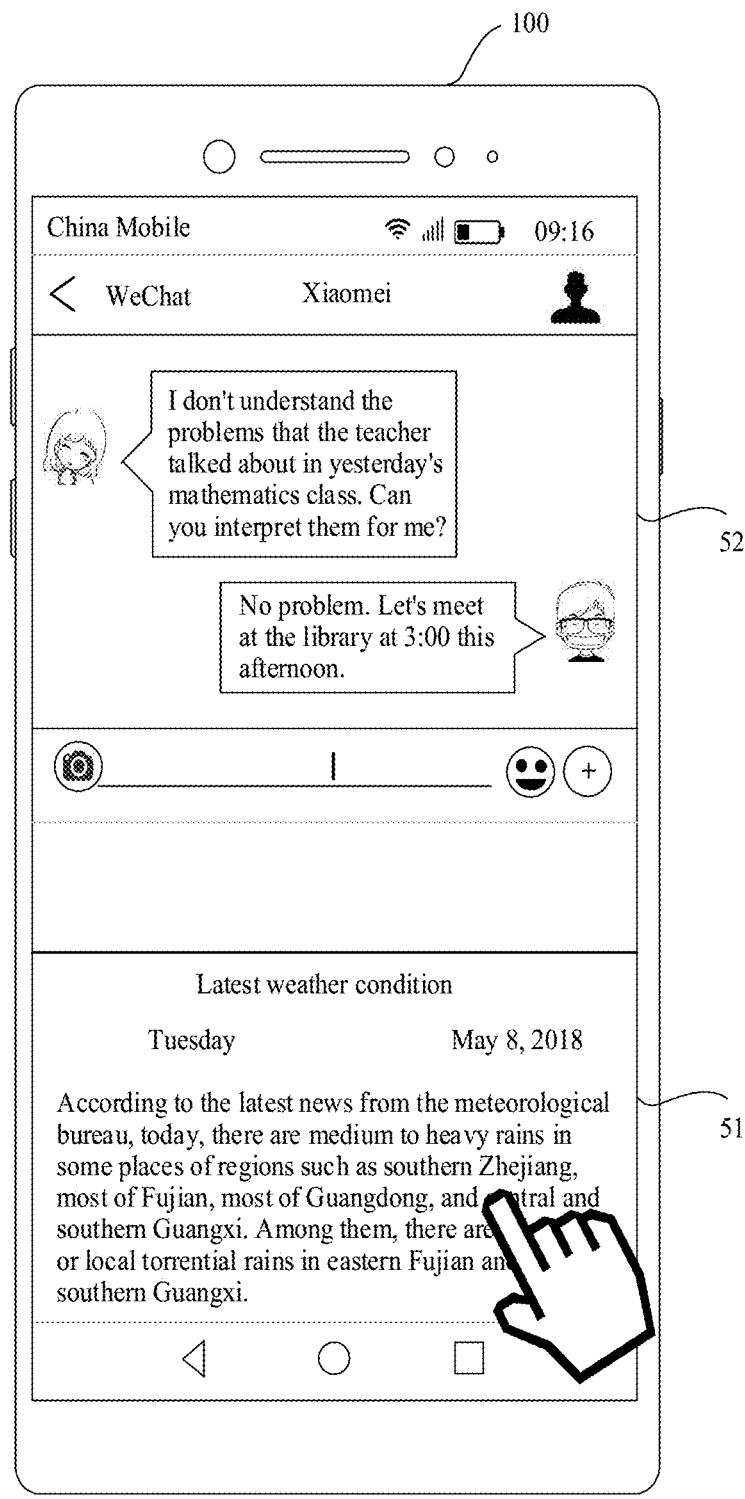
FIG. 12(a) to FIG. 12(c) are a schematic diagram 5 of an example of a display interface of a terminal according to an embodiment of the present invention.
Figure 12B:
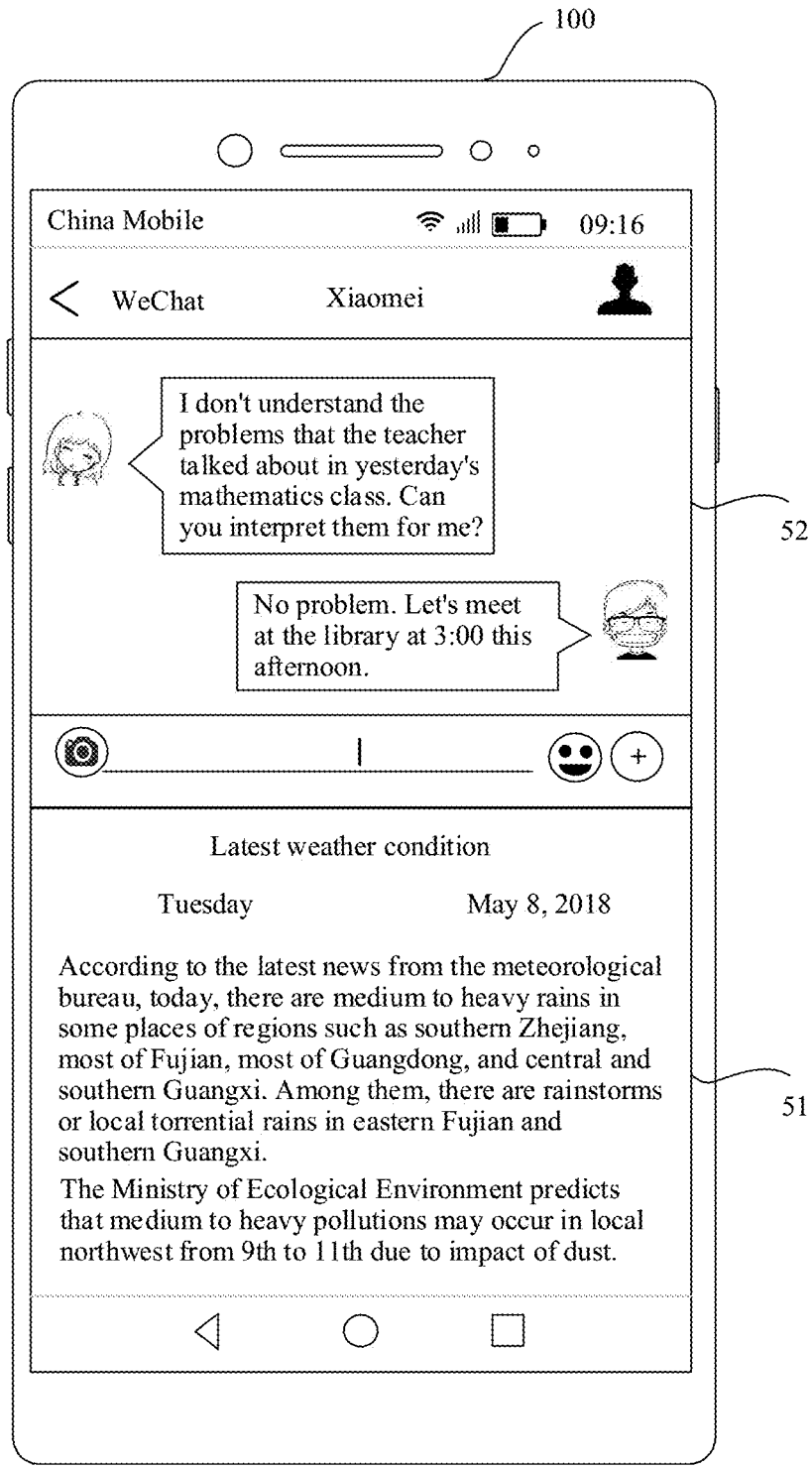
Figure 12C:
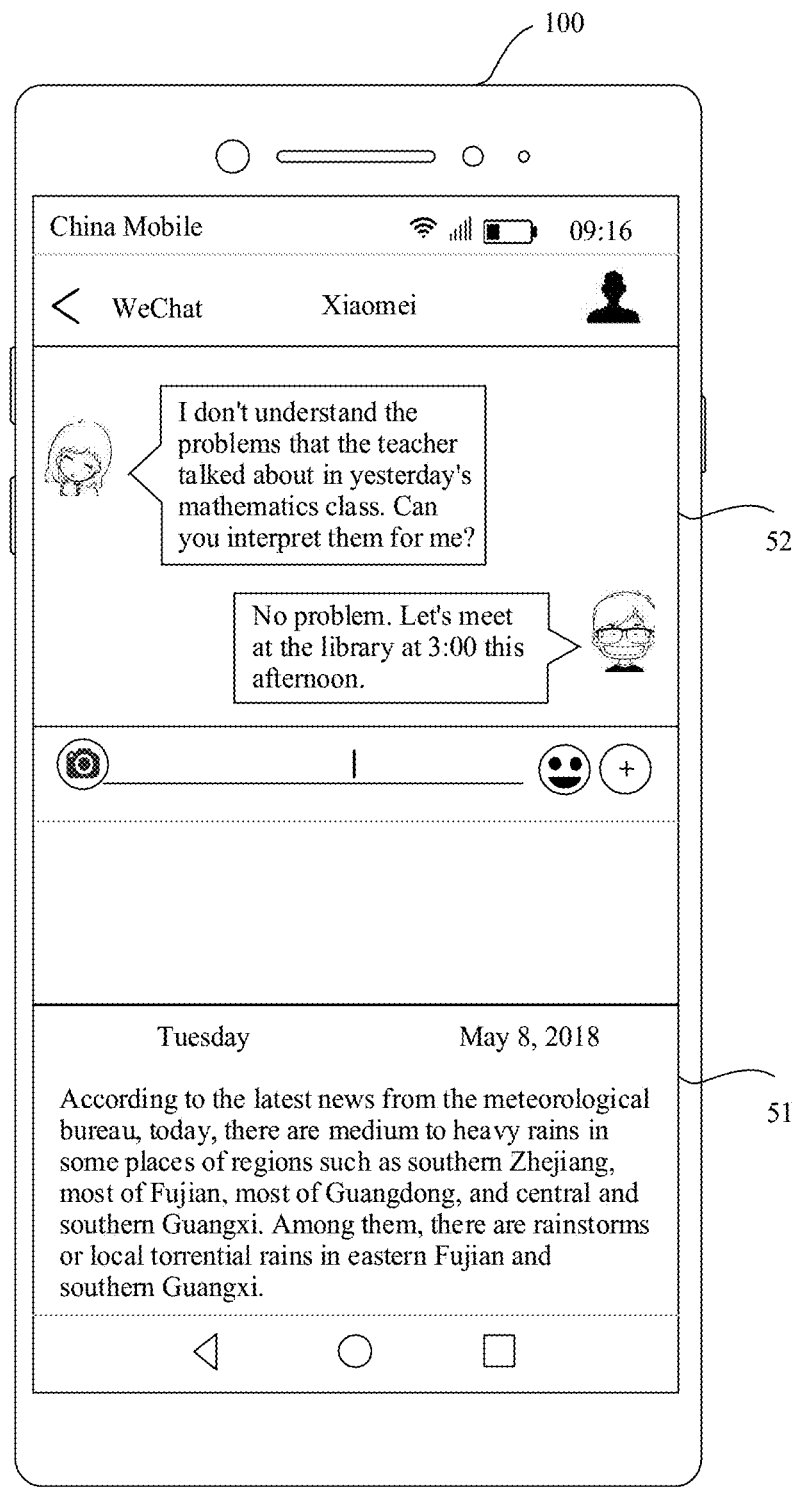

For example, as shown in FIG. 12(*a*), the terminal displays a second interface, and the second interface includes a first display area 51 and a second display area 52. The user may perform a third operation on the first display area 51 on the second interface. The third operation may be an operation of scaling up the first display area, so that the terminal displays an adjusted second interface (including a first display area 51 and the second display area 52) in response to the third operation. As shown in FIG. 12(*b*), the first display area 51 becomes larger, and the second display area 52 remains unchanged. Alternatively, the third operation may be an operation of scaling down the first display area 51, so that the terminal displays an adjusted second interface in response to the third operation. As shown in FIG. 12(*c*), the first display area 51 becomes smaller, and the second display area 52 remains unchanged.

Optionally, the third operation may be alternatively an operation of instructing the terminal to display the first display area in full screen. Therefore, the terminal may display the first display area in full screen in response to the third operation.

In a third implementation, the third operation is an operation of instructing the terminal to adjust the second display area, that is, the user performs the third operation on the second interface, to adjust only the size of the second display area.

Similar to the second implementation, a process of adjusting the size of the second display area is similar to the process of adjusting the size of the first display area. For specific descriptions of the third implementation, refer to the foregoing descriptions of the second implementation. Details are not described herein again.

Figure 13:
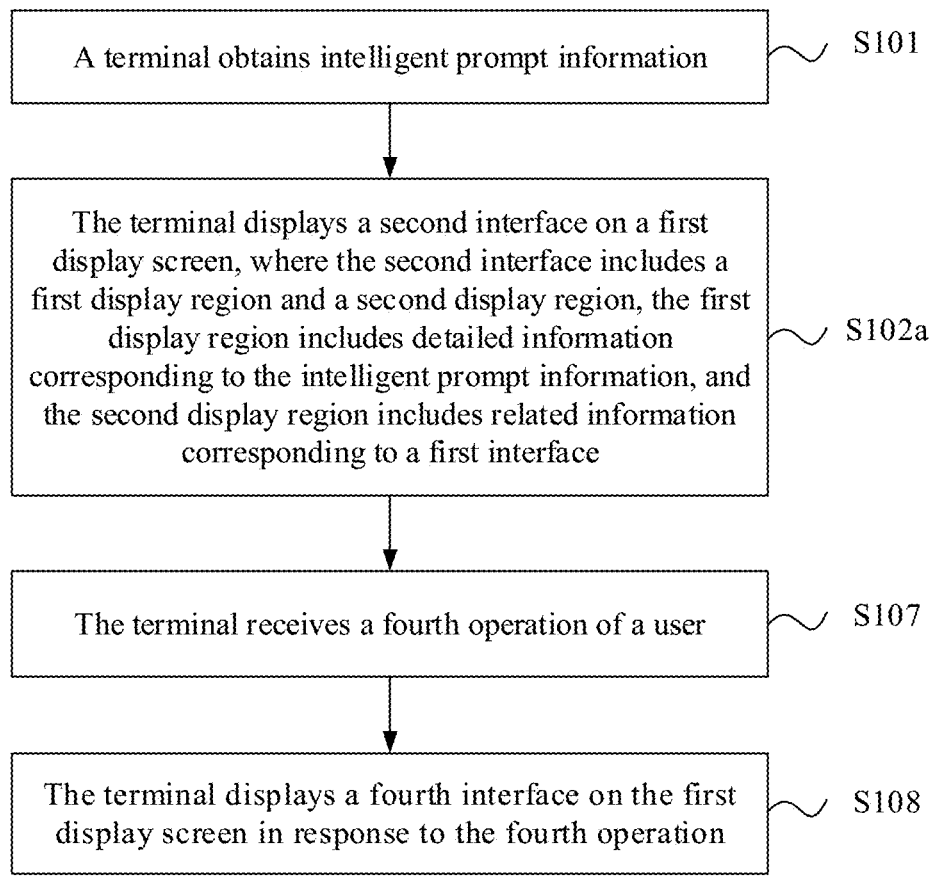
FIG. 13 is a schematic diagram 7 of a split-screen display method for a terminal according to an embodiment of the present invention.

Optionally, with reference to FIG. 3, as shown in FIG. 13, after S102a, the split-screen display method provided in this embodiment of the present invention may further include S107 and S108.

S107. The terminal receives a fourth operation of the user.

S108. The terminal displays a fourth interface on the first display in response to the fourth operation.

In this embodiment of the present invention, after obtaining the intelligent prompt information and displaying the second interface (that is, displaying the related information corresponding to the first interface and the detailed information corresponding to the intelligent prompt information on split screens), the terminal may receive the fourth operation of the user, where the fourth operation is an operation of ending display of the detailed information corresponding to the intelligent prompt information, so that the terminal exits the detailed information corresponding to the intelligent prompt information in response to the fourth operation and displays the fourth interface on the first display.

Optionally, the fourth interface may be the first interface, or the fourth interface may be another interface different from the first interface.

Figure 14A:
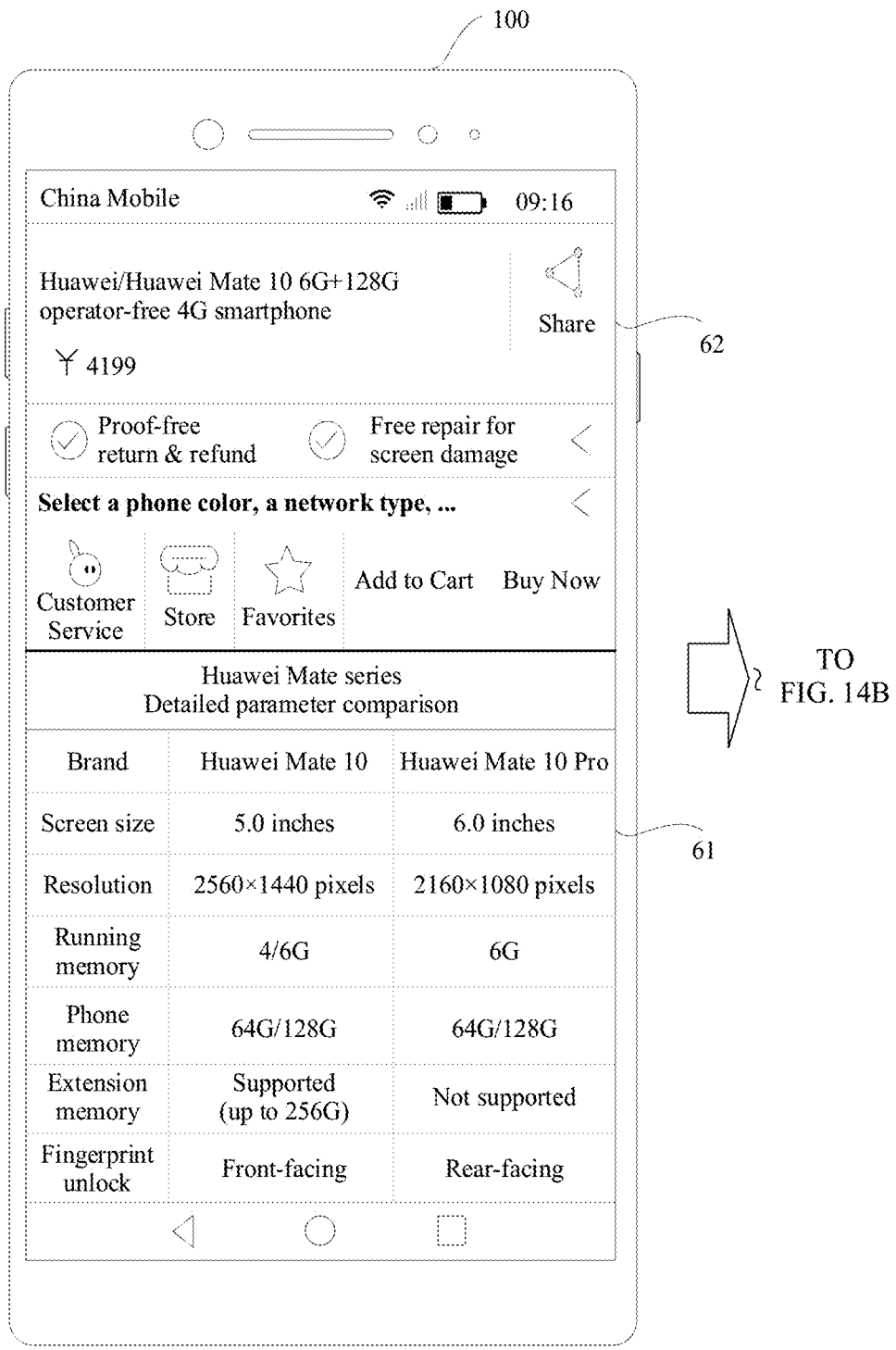
FIG. 14(a) and FIG. 14(b) are a schematic diagram 6 of an example of a display interface of a terminal according to an embodiment of the present invention.
Figure 14B:
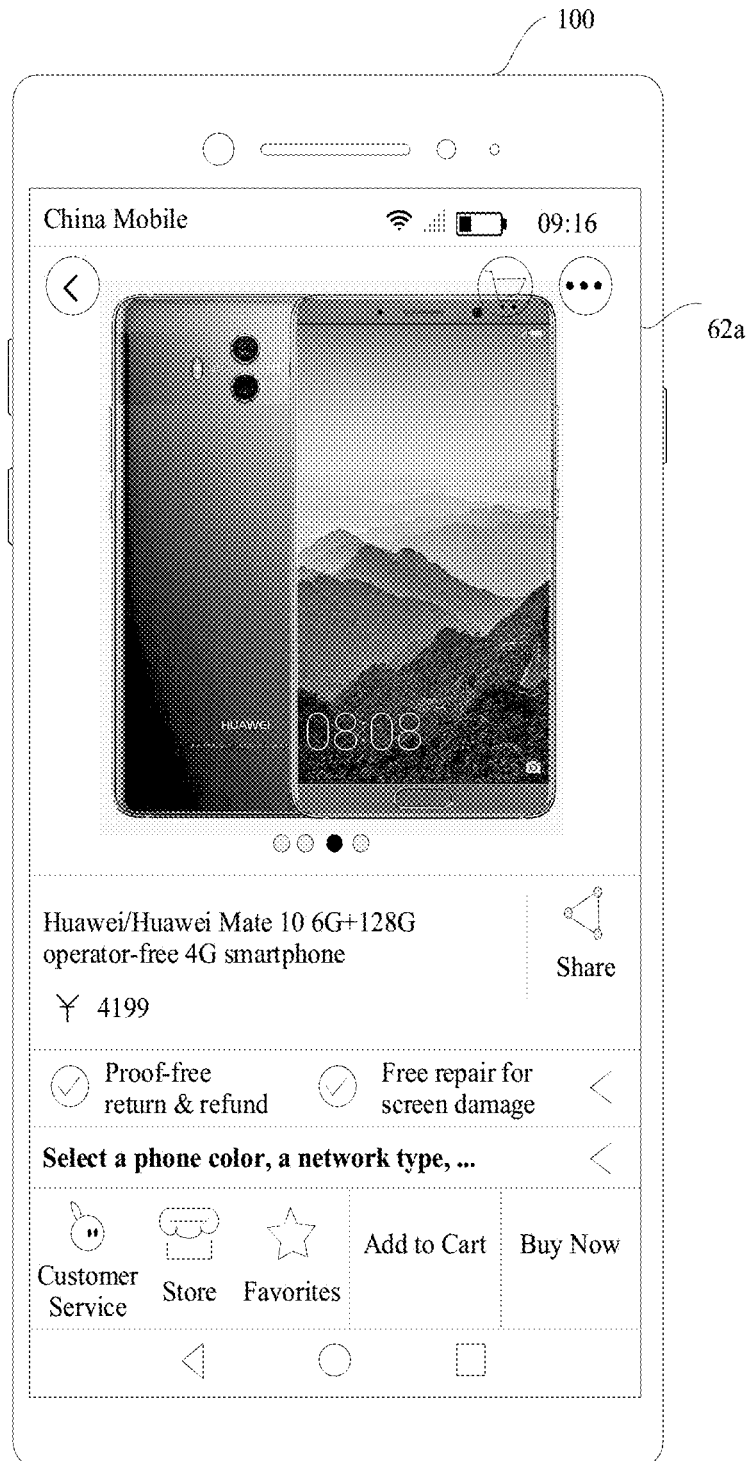

For example, as shown in FIG. 14(*a*), after the mobile phone 100 obtains intelligent prompt information, on a second interface displayed on the mobile phone 100, detailed information that is about the intelligent prompt information and that is included in a first display area 61 is detailed parameter comparison information of a commodity (for example, detailed parameters of Huawei Mate 10 and detailed parameters of Huawei Mate 10 Pro), and related information, of a first interface, that is included in a second display area 62 is an information browsing interface of a commodity (that is, the related information corresponding to the first interface) in a shopping APP, for example, an information browsing interface of the Huawei Mate 10. If the mobile phone 100 currently displays the second interface shown in FIG. 14(*a*), the mobile phone 100 receives a fourth operation of the user, and may quit displaying the detailed parameter comparison information of the commodity in response to the fourth operation. As shown in FIG. 14(*b*), the mobile phone 100 displays an information browsing interface 62a (that is, a fourth interface) of the commodity. It can be learned that the fourth interface 61a is the first interface.

Figure 15A:
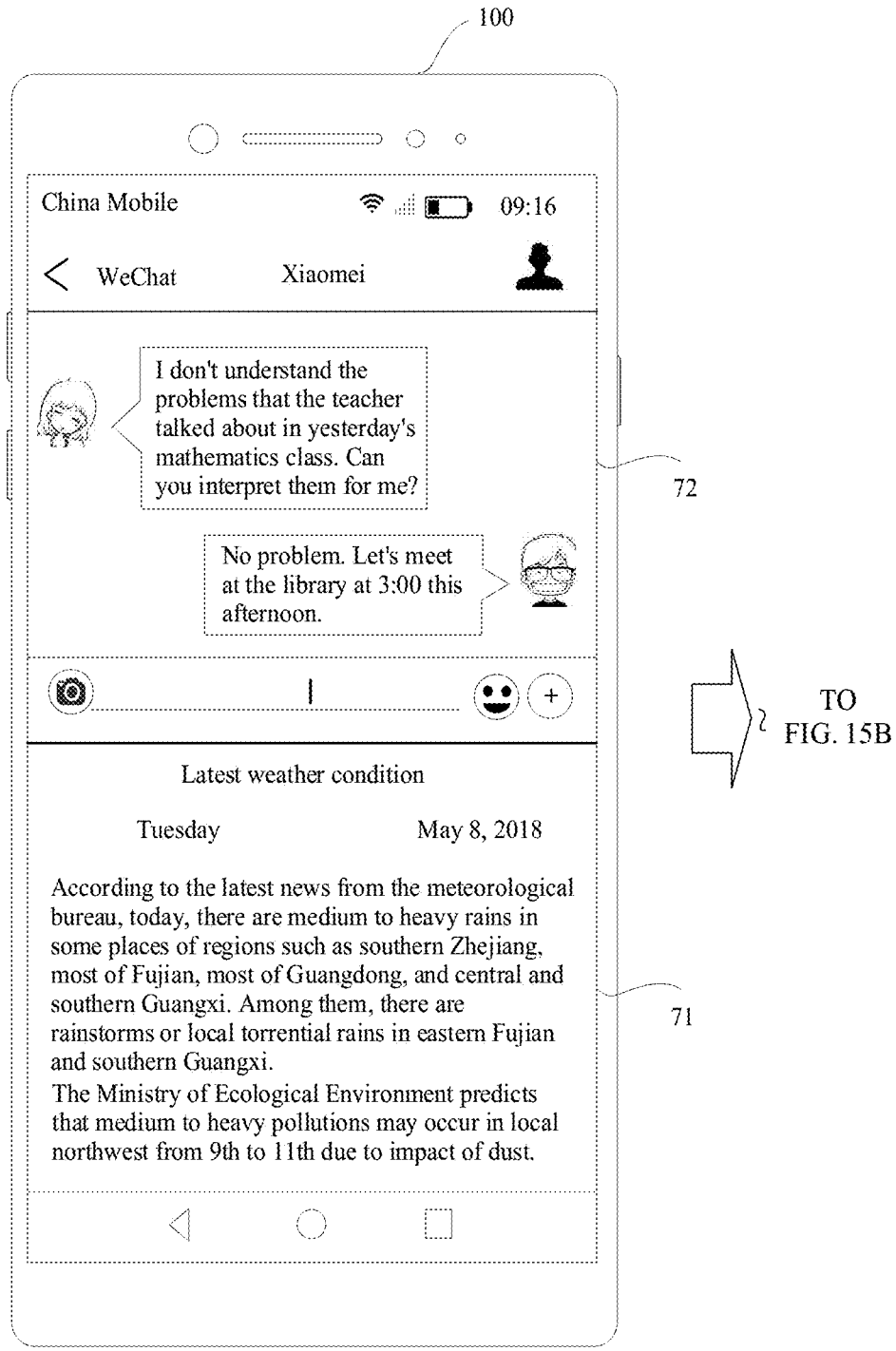
FIG. 15(a) to FIG. 15(c) are a schematic diagram 7 of an example of a display interface of a terminal according to an embodiment of the present invention.
Figure 15B:
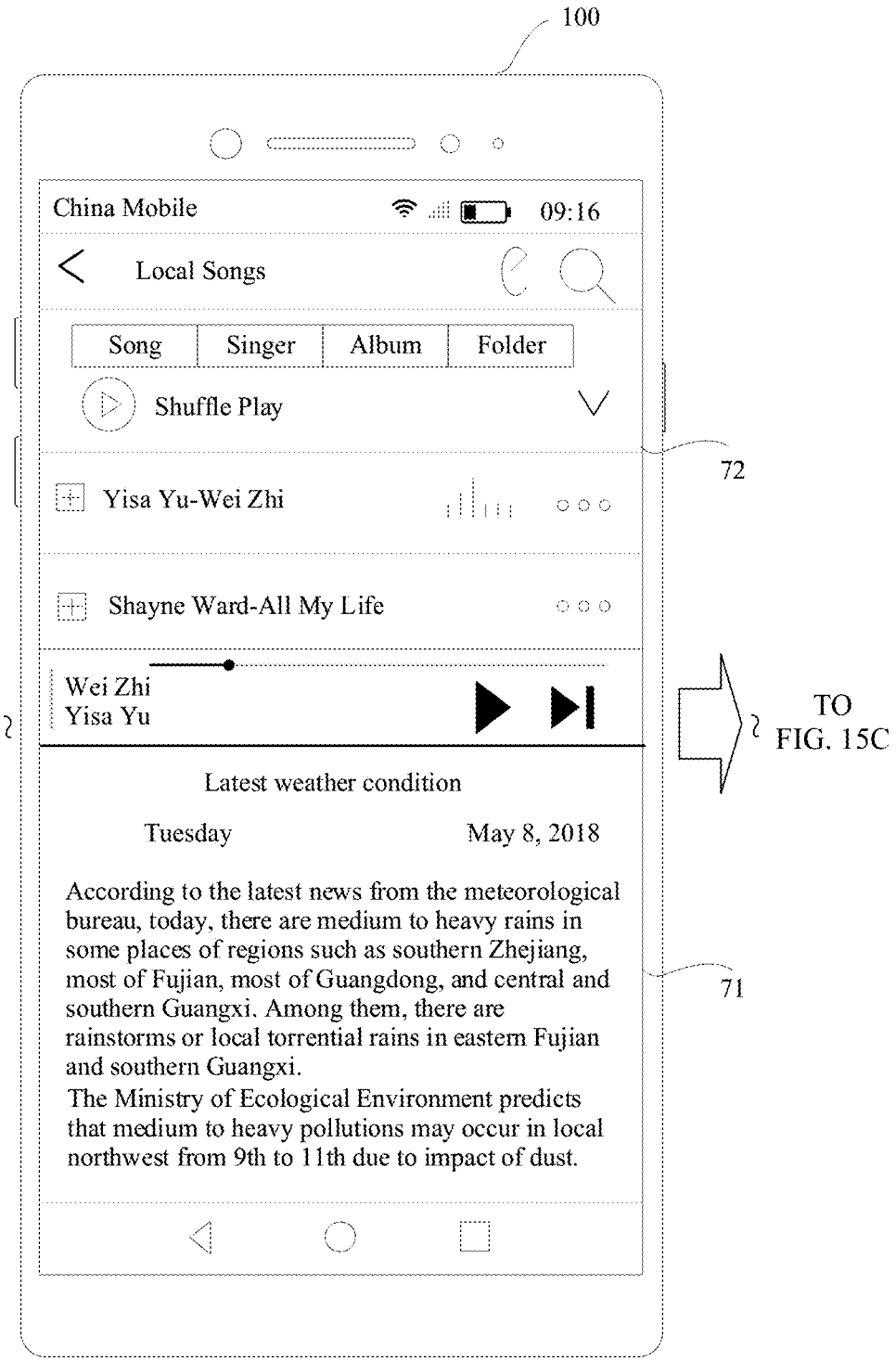
Figure 15C:
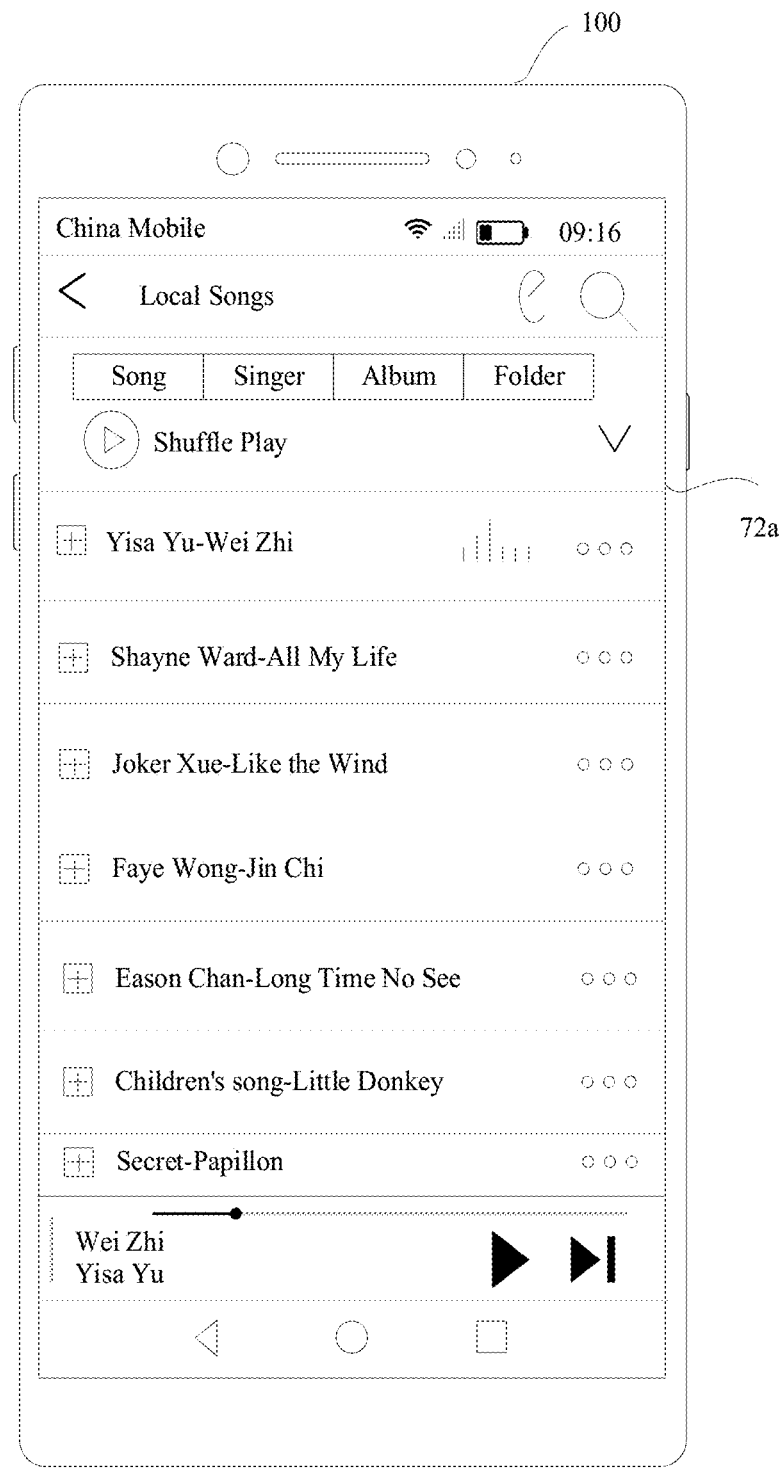

For example, as shown in FIG. 15(*a*), after the mobile phone 100 obtains intelligent prompt information, on a second interface displayed on the mobile phone 100, a first display area 71 includes detailed weather forecast information, and a second display area 72 includes a WeChat chat interface (that is, related information of a first interface). If the user exits WeChat and starts a music player, as shown in FIG. 15(*b*), on a second interface currently displayed on the mobile phone 100, the second display area 72 includes a music play interface, and the first display area 72 includes the detailed weather forecast information. If the mobile phone 100 currently displays the second interface shown in FIG. 15(*b*), the mobile phone 100 receives a fourth operation of the user, and may quit displaying the detailed weather forecast information in response to the fourth operation. As shown in FIG. 15(*c*), the mobile phone 100 displays a music play interface (that is, a fourth interface) 72a. It can be learned that the fourth interface is different from the first interface.

Figure 16:
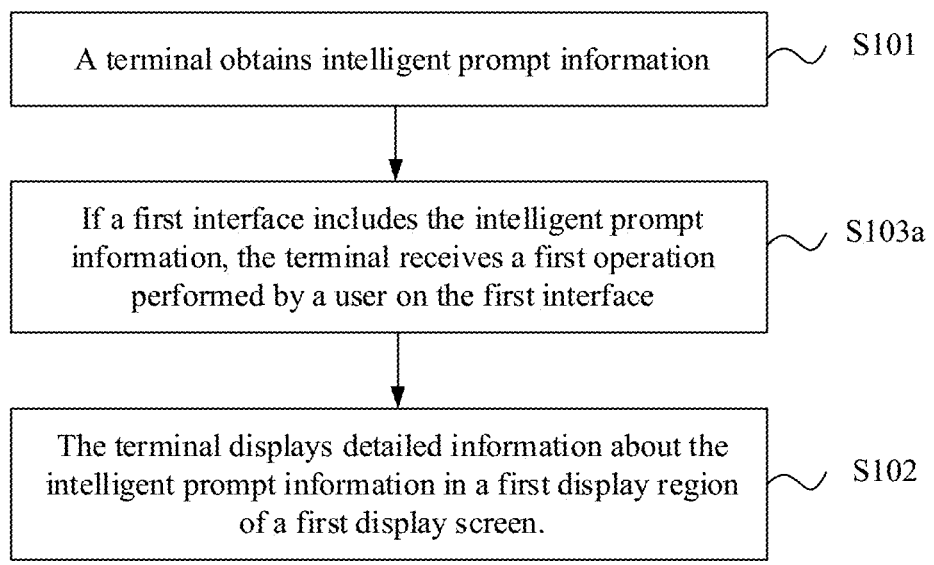
FIG. 16 is a schematic diagram 8 of a split-screen display method for a terminal according to an embodiment of the present invention.

Optionally, with reference to FIG. 6, as shown in FIG. 16, in this embodiment of the present invention, S103 may include S103a.

S103a. If the first interface includes the intelligent prompt information, the terminal receives a first operation performed by the user on the first interface.

In this embodiment of the present invention, after the terminal obtains the intelligent prompt information, when the intelligent prompt information is displayed on the first interface (the intelligent prompt information is displayed by using a fixed bar, a floating window, or a bubble), the user may perform the first operation on the first interface. Specifically, the user may perform the first operation on a region in which the intelligent prompt information is displayed on the first interface, so that the terminal displays the second interface including the first display area and the second display area in response to the first operation.

Figure 17A:
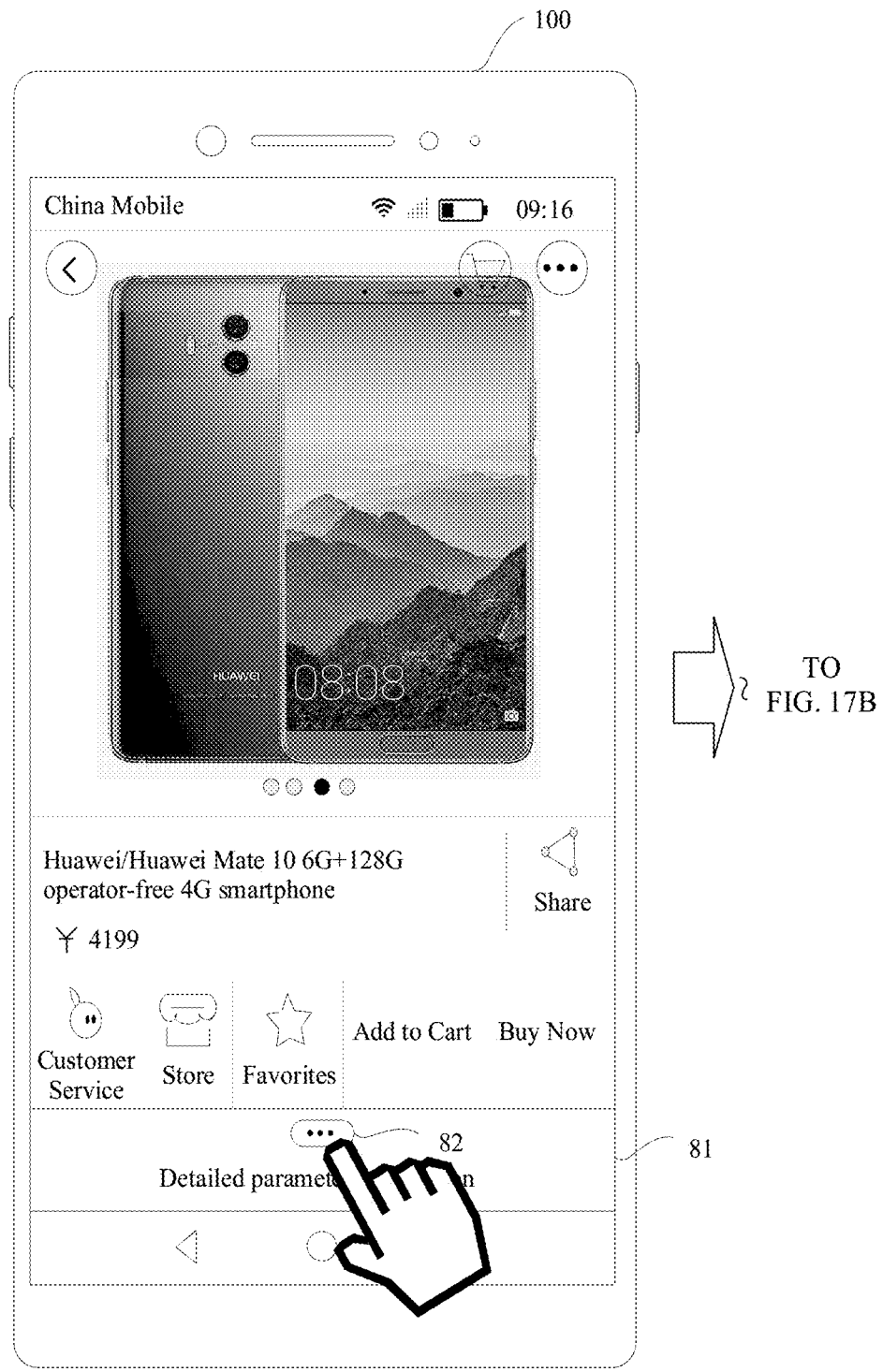
FIG. 17(a) and FIG. 17(b) are a schematic diagram 8 of an example of a display interface of a terminal according to an embodiment of the present invention.
Figure 17B:
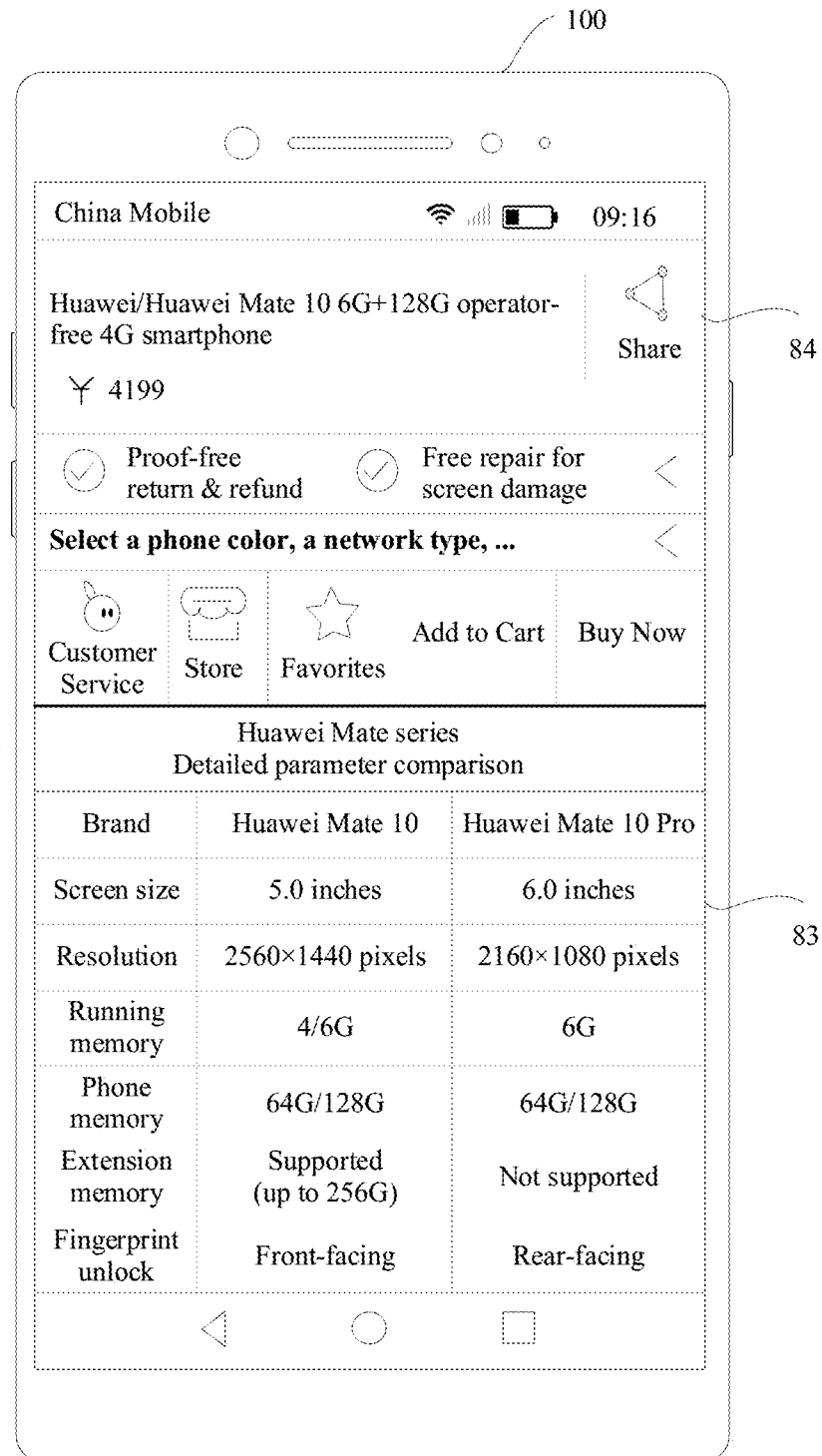

For example, as shown in FIG. 17(a), the display of the mobile phone 100 currently displays an information browsing interface of a commodity (for example, Huawei Mate 10) in a shopping APP, and intelligent prompt information "Detailed parameter comparison" is displayed in a fixed bar 81 at the bottom of the display of the mobile phone 100. The user touches a button 82 in the fixed bar 81, and the operation of touching the button 82 is a first operation. The mobile phone 100 displays a second interface in response to the first operation. As shown in FIG. 17(b), the second interface includes a first display area 83 and a second display area 84, the first display area 83 includes detailed parameter comparison information (for example, including detailed parameters of the Huawei Mate 10 and detailed parameters of Huawei Mate 10 Pro) of the mobile phone, and the second display area 84 includes related information of the information browsing interface of the commodity.

Figure 18:
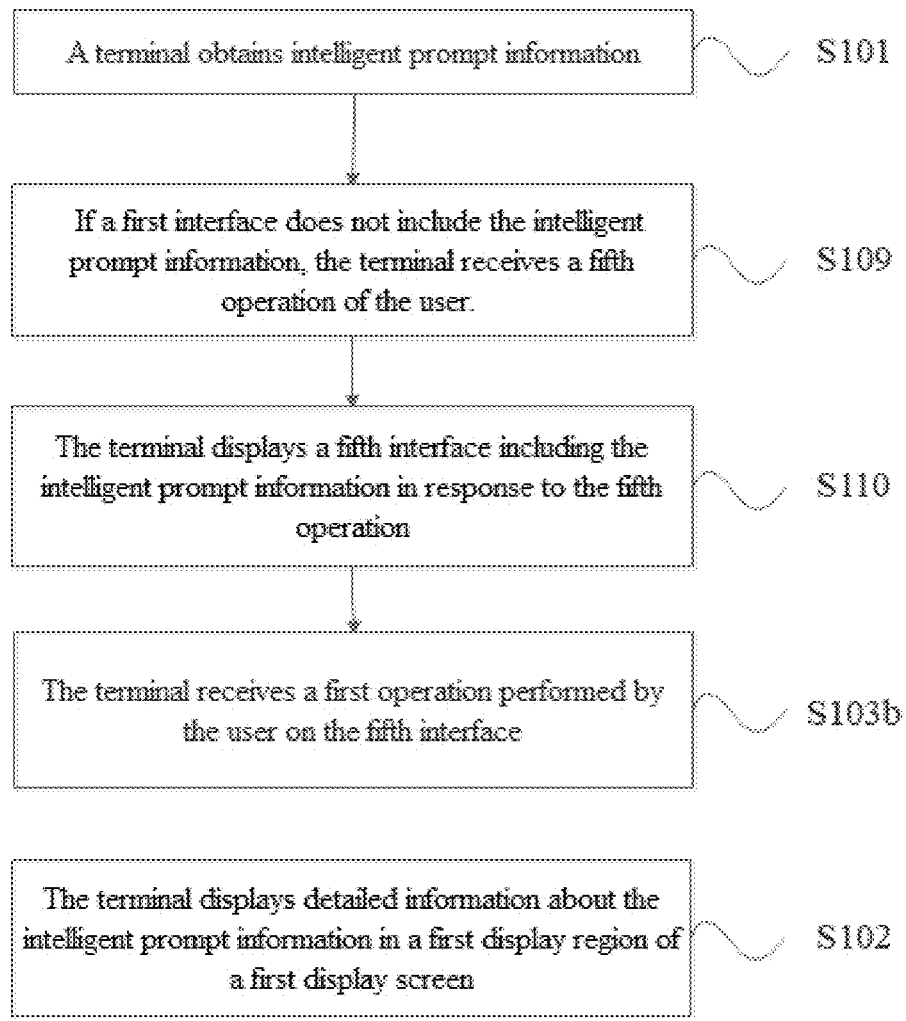
FIG. 18 is a schematic diagram 9 of a split-screen display method for a terminal according to an embodiment of the present invention.

Optionally, in this embodiment of the present invention, with reference to FIG. 6, as shown in FIG. 18, before S103, the split-screen display method provided in this embodiment of the present invention may further include S109 and S110.

S109. If the first interface does not include the intelligent prompt information, the terminal receives a fifth operation of the user.

S110. The terminal displays a fifth interface including the intelligent prompt information in response to the fifth operation.

In this embodiment of the present invention, after the terminal obtains the intelligent prompt information, when the intelligent prompt information is not displayed on the first interface (the intelligent prompt information is displayed by using a drop-down bar or a leftmost screen), the user first performs the fifth operation, and the terminal displays the fifth interface including the intelligent prompt information in response to the fifth operation.

It should be understood that, as shown in FIG. 18, when the first interface does not include the intelligent prompt information, based on S109 and S110, S103 may include S103b.

S103b. The terminal receives a first operation performed by the user on the fifth interface.

In this embodiment of the present invention, after receiving the first operation performed by the user on the fifth interface, the terminal may display the second interface in response to the first operation. For descriptions of the first operation, refer to the specific descriptions of the first operation in S103. Details are not described herein again.

Figure 19A:
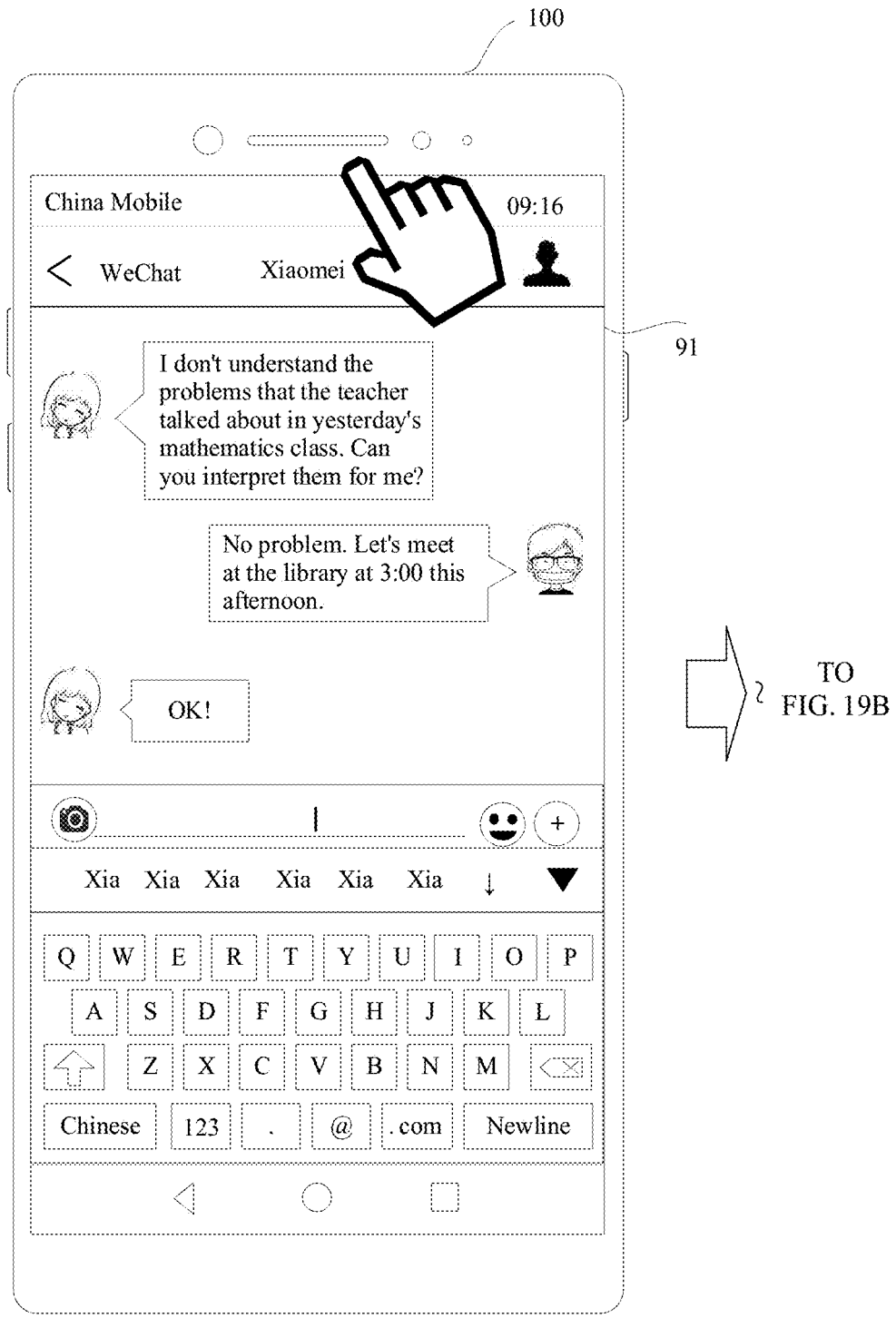
FIG. 19(a) to FIG. 19(c) are a schematic diagram 9 of an example of a display interface of a terminal according to an embodiment of the present invention.
Figure 19B:
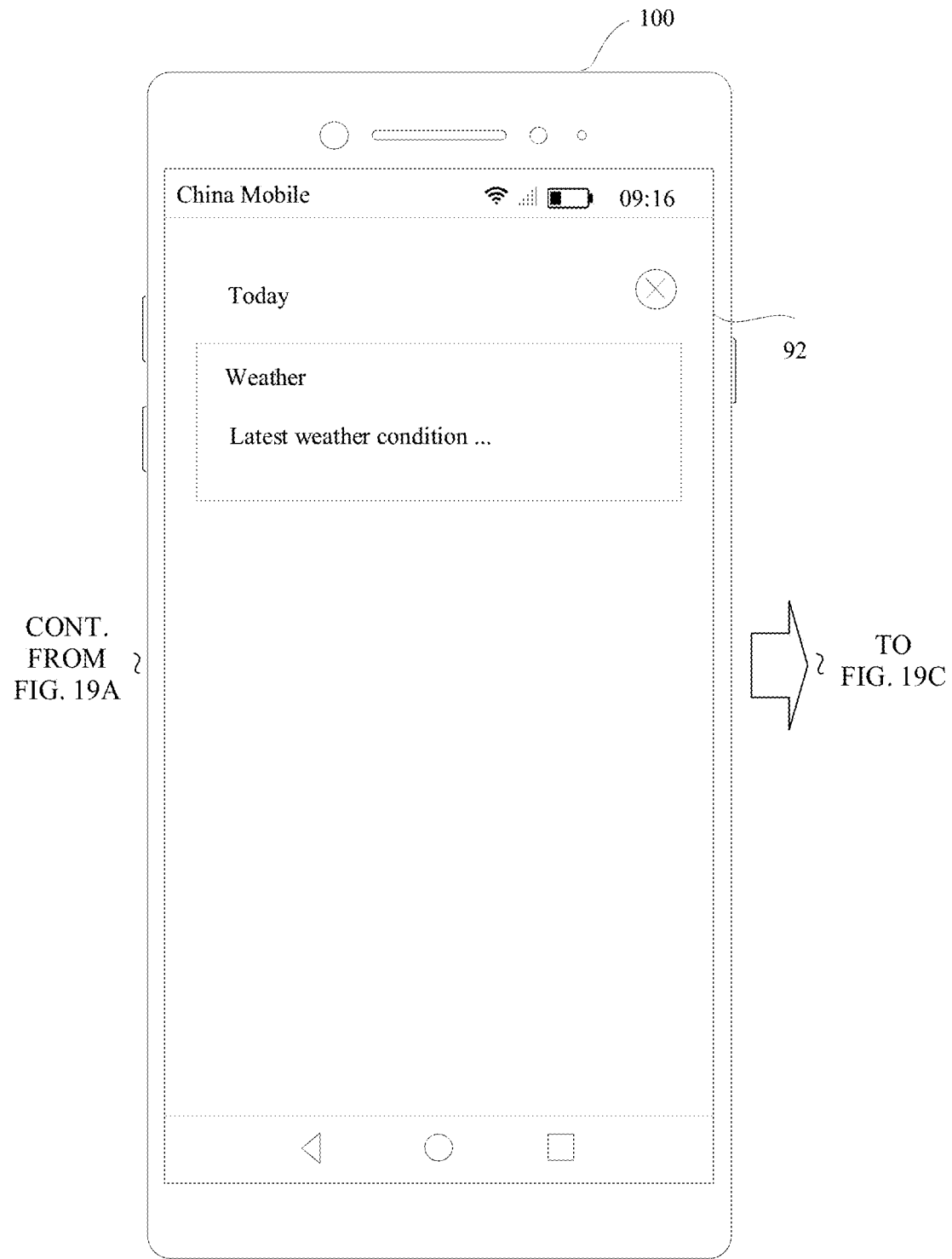
Figure 19C:
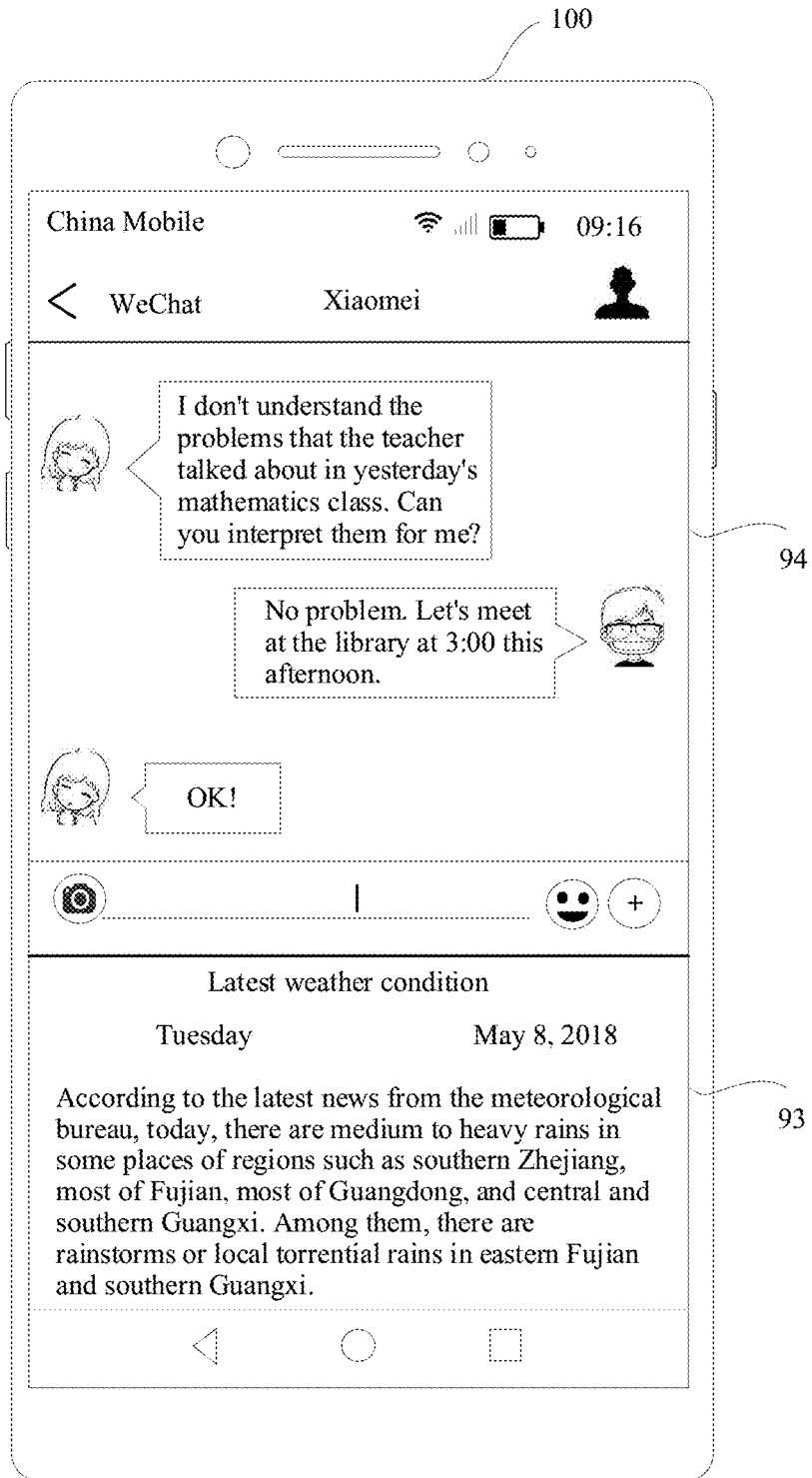

For example, if the intelligent prompt information is displayed by using a drop-down bar, the fifth operation may be an operation of pulling down from the top of the display. As shown in FIG. 19(a), a first interface 91 currently displayed on the mobile phone 100 is a WeChat chat interface. After obtaining weather forecast prompt information, the mobile phone 100 receives a fifth operation of the user, and in response to the fifth operation, as shown in FIG. 19(b), the mobile phone 100 displays a fifth interface 92. The fifth interface 92 includes the weather forecast prompt information "Latest weather condition". Then the mobile phone 100 receives a first operation performed by the user on the fifth interface 92, and in response to the first operation, as shown in FIG. 19(c), the mobile phone 100 displays a second interface. On the second interface displayed on the mobile phone 100, a first display area 93 includes detailed weather forecast information, and a second display area 94 includes the WeChat chat interface (that is, related information of the first interface).

It can be understood that, to implement the foregoing functions, the terminal and the like include corresponding hardware structures and/or software modules for performing the functions. A person of ordinary skill in the art should be easily aware that, in the embodiments of the present invention, units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of the present invention, functional modules of the terminal and the like may be divided based on the foregoing method examples. For example, the functional modules may be divided based on the functions, or at least two functions may be integrated in one processing module. The integrated module may be implemented in a form of hardware, or may be implemented in a form of a software functional module. It should be noted that, in the embodiments of the present invention, module division is an example, and is merely logical function division. There may be another division manner in an actual implementation.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of the present invention, functional modules of the terminal and the like may be divided based on the foregoing method examples. For example, the functional modules may be divided based on the functions, or at least two functions may be integrated in one processing module. The integrated module may be implemented in a form of hardware, or may be implemented in a form of a software functional module. It should be noted that, in the embodiments of the present invention, module division is an example, and is merely logical function division. In actual implementation, another division manner may be used.

Figure 20:
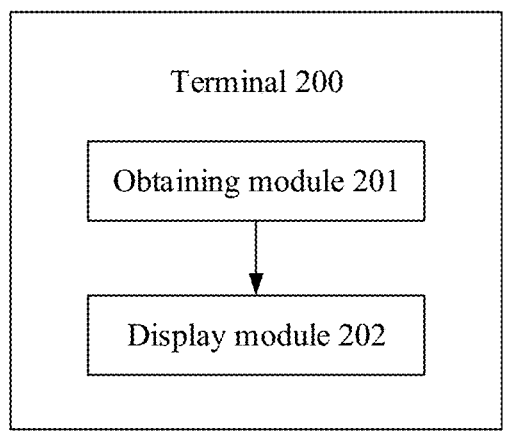
FIG. 20 is a schematic structural diagram 1 of a terminal according to an embodiment of the present invention.

When the functional modules are divided based on the functions, FIG. 20 is a possible schematic structural diagram of the terminal in the foregoing embodiments. The terminal 200 includes an obtaining module 201 and a display module 202. The obtaining module 201 is configured to support the terminal in performing S101 in the foregoing method embodiments, and/or another process used for the technology described in this specification. The display module 202 is configured to support the terminal in performing S102 (including S102a or S102b), S106, S108, and S110 in the foregoing method embodiments, and/or another process used for the technology described in this specification.

Figure 21:
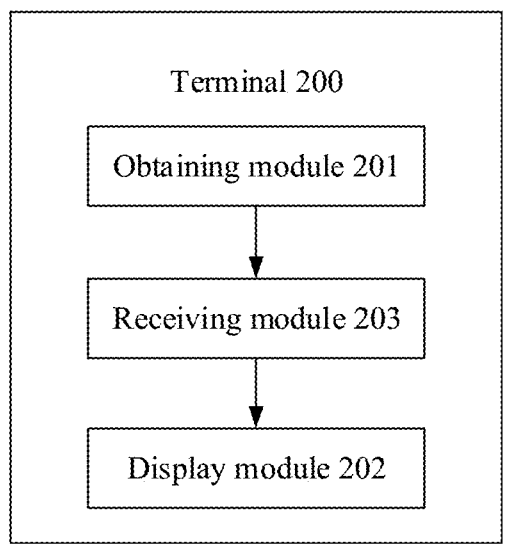
FIG. 21 is a schematic structural diagram 2 of a terminal according to an embodiment of the present invention.

Further, as shown in FIG. 21, the terminal 200 may further include a receiving module 203. The receiving module 203 is configured to support the terminal in performing S103 (including S103a or S103b), S104, S105, S107, and S109 in the foregoing method embodiments, and/or another process used for the technology described in this specification.

For function descriptions of corresponding functional modules, refer to all related content of the steps in the foregoing method embodiments. Details are not described herein again.

In addition, functions that can be specifically implemented by the foregoing functional modules also include but are not limited to functions corresponding to the method steps in the foregoing examples. For detailed descriptions of other modules of the terminal 200, refer to detailed descriptions of method steps corresponding to the modules. Details are not described herein again in this embodiment of this application.

When the integrated unit is used, the obtaining module 201, the receiving module 203, and the like may be integrated in one processing module for implementation, and the display module 202 may be a display.

Figure 22:
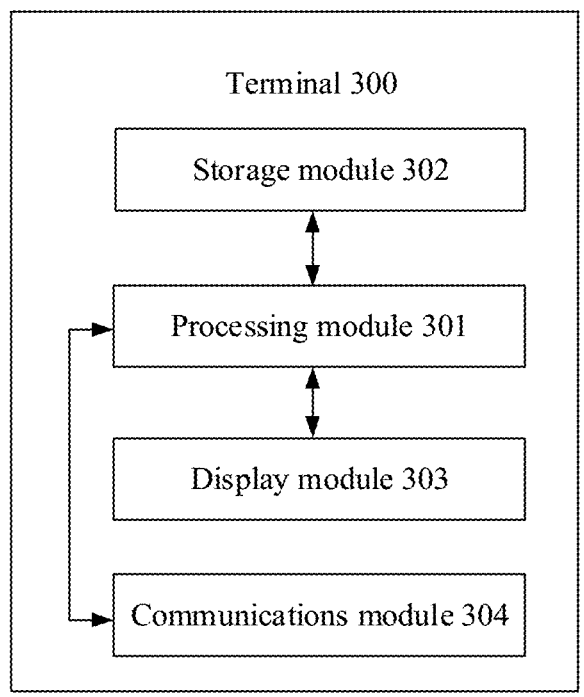
FIG. 22 is a schematic structural diagram 3 of a terminal according to an embodiment of the present invention.

FIG. 22 is a possible schematic structural diagram of the terminal in the foregoing embodiments. The terminal 300 includes a processing module 301, a storage module 302, a display module 303, and a communications module 304. The processing module 301 is configured to control and manage an action of the terminal. The display module 303 is configured to display an image generated by the processing module 301. The storage module 302 is configured to store program code and data of the terminal. The communications module 304 is configured to communicate with another terminal.

The processing module 301 may be a processor or a controller, such as may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or any combination thereof. The processing module 301 may implement or execute various example logical blocks, modules, and circuits described with reference to content disclosed in the present invention. The processor may be a combination for implementing a computing function, for example, a combination including one or more microprocessors, or a combination of a DSP and a microprocessor. The communications module 304 may be a transceiver, a transceiver circuit, a communications interface, or the like. The storage module 302 may be a memory.

When the processing module 301 is a processor (the processor 108 shown in FIG. 1), the communications module 304 is an RF transceiver circuit (the RF circuit 101 shown in FIG. 1), the storage module 302 is a memory (the memory 102 shown in FIG. 1), and the display module 303 is a display (including the touch panel 1031 and the display panel 1041 shown in FIG. 1), the terminal provided in this embodiment of the present invention may be the terminal 100 shown in FIG. 1. The communications module 304 may include not only the RF transceiver circuit, but also a Wi-Fi module and a Bluetooth module. Communications modules such as the RF transceiver circuit, the Wi-Fi module, and the Bluetooth module may be collectively referred to as a communications interface. The processor, the communications interface, the display module, and the storage module may be coupled by using a bus.

An embodiment of the present invention further provides a computer storage medium. The computer storage medium stores computer program code. When the processor executes the computer program code, the terminal performs related method steps in any one of the accompanying drawings FIG. 2, FIG. 3, FIG. 6 to FIG. 8, FIG. 10, FIG. 13, FIG. 16, and FIG. 18, to implement the split-screen display method in the foregoing embodiments.

This application further provides a computer program product. When the computer program product runs on a computer, the computer is enabled to perform related method steps in any one of the accompanying drawings FIG. 2, FIG. 3, FIG. 6 to FIG. 8, FIG. 10, FIG. 13, FIG. 16, and FIG. 18, to implement the split-screen display method in the foregoing embodiments.

The terminal 200, the terminal 300, the computer storage medium, and the computer program product provided in this application are all configured to perform the corresponding methods provided in the foregoing descriptions. Therefore, for beneficial effects that can be achieved by the terminal 200, the terminal 300, the computer storage medium, and the computer program product, refer to the beneficial effects of the corresponding methods provided in the foregoing descriptions. Details are not described herein again.

It may be clearly understood by a person skilled in the art that, for the purpose of convenient and brief description, division of the foregoing function modules is taken as an example for illustration. In actual application, the foregoing functions can be allocated to different function modules and implemented according to a requirement. In other words, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A split-screen display method, implemented by a terminal, wherein the split-screen display method comprises:
   displaying a first interface on a first display, wherein the first interface comprises commodity information of a commodity, and wherein the first interface is of a first application;
   obtaining first intelligent prompt information related to the commodity, wherein the first intelligent prompt information is generated by an intelligent processing module of the terminal and is related to the first application;
   displaying a second interface on the first display, wherein the second interface comprises a first display area and a second display area, wherein the first display area comprises first detailed information corresponding to the first intelligent prompt information related to the commodity, and wherein the second display area comprises first related information corresponding to the first interface and the commodity information;
   displaying a third interface on the first display, wherein the third interface is of a second application;
   obtaining second intelligent prompt information, wherein the second intelligent prompt information is generated by the intelligent processing module, and wherein the second intelligent prompt information is unrelated to operating the second application; and
   displaying a fourth interface on the first display, wherein the fourth interface comprises a third display area and a fourth display area, wherein the third display area comprises second detailed information corresponding to the second intelligent prompt information, and wherein the fourth display area comprises second related information corresponding to the third interface.

2. The split-screen display method of claim 1, wherein after obtaining the first intelligent prompt information and before displaying the first detailed information, the split-screen display method further comprises receiving an operation from the user to display the first detailed information in a partial display area of the first display.

3. The split-screen display method of claim 2, further comprising displaying the second interface on the first display in response to the operation.

4. The split-screen display method of claim 1, wherein before obtaining the first intelligent prompt information, the split-screen display method further comprises receiving an operation from the user to display the second interface on the first display when the first intelligent prompt information is obtained.

5. The split-screen display method of claim 1, wherein after displaying the second interface on the first display, the split-screen display method further comprises:
   receiving an operation from the user on the second interface to adjust a size of the first display area or the second display area; and
   displaying a fifth interface in response to the operation, wherein the fifth interface comprises an adjusted first display area or an adjusted second display area.

6. The split-screen display method of claim 5, wherein the second interface further comprises an area division line, wherein the split-screen display method further comprises receiving the operation from the user on the area division line, and wherein the fifth interface comprises the adjusted first display area and the adjusted second display area.

7. The split-screen display method of claim 1, wherein after displaying the second interface on the first display, the split-screen display method further comprises:
   receiving an operation from the user; and
   displaying a fifth interface on the first display in response to the fourth operation.

8. The split-screen display method of claim 2, further comprising receiving the operation from the user on the first interface when the first interface comprises the first intelligent prompt information.

9. The split-screen display method of claim 1, wherein the first application is a shopping application, wherein the first intelligent prompt information is obtained in response to browsing the commodity in the shopping application on the terminal, and wherein the first intelligent prompt information includes detailed prompt information about the commodity.

10. The split-screen display method of claim 1, wherein the second application is a chat application, wherein the second intelligent prompt information is obtained in response to the user performing chatting in the chat application, and wherein the second intelligent prompt information is forecast prompt information based on a current weather condition.

11. A terminal comprising:
    at least one first display;
    a processor coupled to the first display; and
    a memory coupled to the processor, wherein the memory is configured to store computer program code comprising instructions that, when executed by the processor, cause the terminal to be configured to:
    display a first interface on the first display, wherein the first interface comprises commodity information of a commodity, and wherein the first interface is of a first application;
    obtain first intelligent prompt information related to the commodity, wherein the first intelligent prompt information is generated by an intelligent processing module of the terminal and is related to the first application;
    display a second interface on the first display, wherein the second interface comprises a first display area and a second display area, wherein the first display area comprises first detailed information corresponding to the first intelligent prompt information related to the commodity, and wherein the second display area comprises first related information corresponding to the first interface and the commodity information;

display a third interface on the first display, wherein the third interface is of a second application;
obtain second intelligent prompt information, wherein the second intelligent prompt information is generated by the intelligent processing module, and wherein the second intelligent prompt information is unrelated to operating the second application; and
display a fourth interface on the first display, wherein the fourth interface comprises a third display area and a fourth display area, wherein the third display area comprises second detailed information corresponding to the second intelligent prompt information, and wherein the fourth display area comprises second related information corresponding to the third interface.

12. The terminal of claim 11, wherein after the instructions cause the terminal to obtain the first intelligent prompt information and before the instructions cause the terminal to display the first detailed information, the instructions further cause the terminal to be configured to receive an operation from the user to display the first detailed information in a partial display area of the first display.

13. The terminal of claim 12, wherein the instructions further cause the terminal to be configured to display the second interface on the first display in response to the first operation.

14. The terminal of claim 11, wherein before the instructions cause the terminal to obtain the first intelligent prompt information, the instructions further cause the terminal to be configured to receive an operation from the user to display the second interface on the first display when the instructions cause the terminal to obtain the first intelligent prompt information.

15. The terminal of claim 11, wherein after the instructions cause the terminal to display the second interface on the first display, the instructions further cause the terminal to be configured to:
receive an operation from the user on the second interface to adjust a size of the first display area or the second display area; and
display a fifth interface in response to the operation, wherein the fifth interface comprises an adjusted first display area or an adjusted second display area.

16. The terminal of claim 15, wherein the second interface further comprises an area division line, wherein the instructions further cause the terminal to be configured to receive the operation from the user on the area division line, wherein the fifth interface comprises the adjusted first display area and the adjusted second display area.

17. The terminal of claim 11, wherein after the instructions cause the terminal to display the second interface on the first display, the instructions further cause the terminal to be configured to:
receive an operation from the user; and
display a fifth interface on the first display in response to the operation.

18. The terminal of claim 12, wherein the first interface comprises the first intelligent prompt information, wherein the instructions further cause the terminal to be configured to receive the first operation from the user on the first interface.

19. The terminal of claim 11, wherein the first application is a shopping application, wherein the first intelligent prompt information is obtained in response to browsing the commodity in the shopping application on the terminal, and wherein the first intelligent prompt information includes detailed prompt information about the commodity.

20. The terminal of claim 11, wherein the second application is a chat application, wherein the second intelligent prompt information is obtained in response to the user performing chatting in the chat application, and wherein the second intelligent prompt information is forecast prompt information based on a current weather condition.

* * * * *

UNITED STATES PATENT AND TRADEMARK OFFICE
CERTIFICATE OF CORRECTION

| | |
|---|---|
| PATENT NO. | : 11,513,671 B2 |
| APPLICATION NO. | : 17/059733 |
| DATED | : November 29, 2022 |
| INVENTOR(S) | : Zhiheng Wu, Honglei Luo and Wei Zhao |

It is certified that error appears in the above-identified patent and that said Letters Patent is hereby corrected as shown below:

In the Claims

Claim 13, Column 25, Line 25: "response to the first" should read "response to the"

Signed and Sealed this
Third Day of January, 2023

Katherine Kelly Vidal
*Director of the United States Patent and Trademark Office*